United States Patent
Hatada

(10) Patent No.: US 12,003,683 B2
(45) Date of Patent: Jun. 4, 2024

(54) SERVER FOR DEVICE INFORMATION MANAGEMENT SYSTEM FOR REGISTERING SERVICES, AND NON-TRANSITORY COMPUTER-READABLE RECORDING MEDIUM THEREFOR

(71) Applicant: Brother Kogyo Kabushiki Kaisha, Nagoya (JP)

(72) Inventor: Kumi Hatada, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/176,641

(22) Filed: Mar. 1, 2023

(65) Prior Publication Data

US 2023/0289119 A1  Sep. 14, 2023

(30) Foreign Application Priority Data

Mar. 11, 2022  (JP) .................. 2022-037819

(51) Int. Cl.
  *H04N 1/34* (2006.01)
  *H04N 1/00* (2006.01)
  *H04N 1/44* (2006.01)

(52) U.S. Cl.
  CPC ........... *H04N 1/34* (2013.01); *H04N 1/00344* (2013.01); *H04N 1/00514* (2013.01); *H04N 1/4433* (2013.01); *H04N 2201/0082* (2013.01)

(58) Field of Classification Search
  CPC .. H04N 1/34; H04N 1/00344; H04N 1/00514; H04N 1/4433; H04N 2201/0082
  See application file for complete search history.

(56) References Cited

U.S. PATENT DOCUMENTS

| 11,528,381 | B1 * | 12/2022 | Matsumura | ........ H04N 1/00413 |
| 2008/0068647 | A1 * | 3/2008 | Isobe | ................... H04N 1/4413 358/1.15 |

(Continued)

FOREIGN PATENT DOCUMENTS

JP  2015-018473  1/2015

*Primary Examiner* — Nicholas Pachol
(74) *Attorney, Agent, or Firm* — KENEALY VAIDYA LLP

(57) ABSTRACT

A server for a device information management system includes a terminal device, and a communication device. The server has a storage and a controller. The controller is configured to perform registering user information indicating a user, first service information indicating a first service to be provided to the user, and authentication information in an associated manner, obtaining a request containing the user information from the terminal device, in response to the request, transmitting the authentication information associated with the request to the terminal device, obtaining target communication device information indicating a target device and the authentication information received by the terminal device from the target communication device, and registering the target communication device information in the storage in association with the user information associated with the authentication information obtained from the target communication device and the first service information associated with the authentication information obtained from the target communication device.

11 Claims, 15 Drawing Sheets

(56) References Cited

U.S. PATENT DOCUMENTS

| | | | |
|---|---|---|---|
| 2010/0088609 A1* | 4/2010 | Kawana | G03G 15/502 |
| | | | 715/740 |
| 2011/0075204 A1* | 3/2011 | Yoshimura | G06F 3/1288 |
| | | | 358/1.15 |
| 2015/0020169 A1 | 1/2015 | Mori | |
| 2017/0094079 A1* | 3/2017 | Watanabe | G06F 3/1238 |
| 2022/0086292 A1* | 3/2022 | Kirihara | H04N 1/00411 |
| 2022/0385788 A1* | 12/2022 | Kumahashi | G06F 21/608 |
| 2022/0417371 A1* | 12/2022 | Nagao | H04N 1/00344 |
| 2023/0085170 A1* | 3/2023 | Inoue | H04N 1/00217 |
| | | | 358/1.14 |
| 2023/0229371 A1* | 7/2023 | Hata | G06F 3/1204 |
| | | | 358/1.9 |
| 2023/0244426 A1* | 8/2023 | Kitahashi | H04N 1/4446 |
| | | | 358/1.14 |

* cited by examiner

531

| SERVICE ACCOUNT IDENTIFIER SA | EMAIL ADDRESS AD | PASSWORD PW | MANAGEMENT ACCOUNT IDENTIFIER MA |
|---|---|---|---|
| SA1 | AD1 | PW1 | MA1 |
| ⋮ | ⋮ | ⋮ | ⋮ |

| SERVICE ACCOUNT IDENTIFIER SA | PIN | SERIAL NUMBER SN | PLAN IDENTIFIER PL |
|---|---|---|---|
| SA1 | PN1 | SN1 | PL1 |
| ⋮ | ⋮ | ⋮ | ⋮ |

| MANAGEMENT ACCOUNT IDENTIFIER MA | EMAIL ADDRESS AD |
|---|---|
| MA1 | AD1 |
| ⋮ | ⋮ |

| MANAGEMENT ACCOUNT IDENTIFIER MA | PIN |
|---|---|
| MA1 | PN1 |
| ⋮ | ⋮ |

| SERIAL NUMBER SN | MANAGEMENT ACCOUNT IDENTIFIER MA | PIN |
|---|---|---|
| SN1 | MA1 | PN1 |
| ⋮ | ⋮ | ⋮ |

| SERVICE ACCOUNT IDENTIFIER SA | PIN | SERIAL NUMBER SN | MODEL NAME MD | PLAN IDENTIFIER PL |
|---|---|---|---|---|
| SA1 | PN1 | SN1 | MD1 | PL1 |
| ⋮ | ⋮ | ⋮ | ⋮ | ⋮ |

| SERIAL NUMBER SN | MANAGEMENT ACCOUNT IDENTIFIER MA | MODEL NAME MD | PIN |
|---|---|---|---|
| SN1 | MA1 | MD1 | PN1 |
| ⋮ | ⋮ | ⋮ | ⋮ |

SERVER FOR DEVICE INFORMATION MANAGEMENT SYSTEM FOR REGISTERING SERVICES, AND NON-TRANSITORY COMPUTER-READABLE RECORDING MEDIUM THEREFOR

REFERENCE TO RELATED APPLICATIONS

This application claims priority from Japanese Patent Application No. 2022-037819 filed on Mar. 11, 2022. The entire content of the priority application is incorporated herein by reference.

BACKGROUND ART

The present disclosures relate to a device information management system, and more particularly, to a server for a communication device information management system and a non-transitory computer-readable recording medium for such a server.

Various devices, such as printers and scanners, are generally configured to communicate with other devices over a network. Servers can be used to manage such communication devices. For example, there has been known technology as follows. A management server is configured to receive information indicating the degree of wear and tear of consumables from a device. The management server then provides the thus received information to a user. Authentication is performed for communication between the management server and the device. The user operates a terminal device to log in to a registration server. The registration server causes a terminal device to display a registration screen. The user then enters an IP address of the device he/she wishes to have managed by the management server on the registration screen. The registration server requests the management server to generate a PIN code. The management server creates a PIN code and transmits the created PIN code to the registration server. The registration server generates a URL containing the received PIN code and the IP address of the device. The registration server then causes a communication terminal to display a registration screen containing the generated URL. The user inputs an operation to select the URL included in the registration screen to the communications terminal. The communication terminal transmits an HTTP request containing the PIN code to the device identified by the IP address. The device transmits a connection request containing the PIN code to the management server. The management server authenticates the device with the use of the PIN code.

According to aspects of the present disclosures, there is provided a server for a device information management system that includes a terminal device and a communication device. The server has a storage and a controller including hardware, the controller being configured to perform first registering user information indicating a user, first service information indicating a first service to be provided to the user, and authentication information in an associated manner, first obtaining a request containing the user information from the terminal device, in response to the request, first transmitting the authentication information associated with the request to the terminal device, second obtaining target communication device information indicating a target device and the authentication information received by the terminal device from the target communication device, and second registering the target communication device information in the storage in association with the user information associated with the authentication information obtained from the target communication device and the first service information associated with the authentication information obtained from the target communication device.

According to aspects of the present disclosures, there is provided a server for a device information management system that includes a terminal device, and a communication device. The server has a storage and a controller including hardware, the controller being configured to perform first registering user information indicating a user, first service information indicating a first service to be provided to the user, and authentication information in an associated manner, first obtaining a request containing the user information from the terminal device, in response to the request, first transmitting the authentication information associated with the request to the terminal device, second obtaining target communication device information indicating a target device and the authentication information received by the terminal device from the target communication device, and when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device.

According to aspects of the present disclosures, there is provided a non-transitory computer-readable recording medium for a server of a device information management system that includes a terminal device, and a communication device. The server has a storage and a controller including hardware. The recording medium contains computer-executable instructions which cause, when executed by the controller, the server to perform first registering user information indicating a user, first service information indicating a first service to be provided to the user, and authentication information in an associated manner, first obtaining a request containing the user information from the terminal device, in response to the request, first transmitting the authentication information associated with the request to the terminal device, second obtaining target communication device information indicating a target device and the authentication information received by the terminal device from the target communication device, and second registering the target communication device information in the storage in association with the user information associated with the authentication information obtained from the target communication device and the first service information associated with the authentication information obtained from the target communication device.

According to aspects of the present disclosures, there is provided a non-transitory computer-readable recording medium for a server of a device information management system that includes a terminal device, and a communication device. The server has a storage and a controller including hardware. The recording medium contains computer-executable instructions which cause, when executed by the controller, the server to perform first registering user information indicating a user, first service information indicating a first service to be provided to the user, and authentication information in an associated manner, first obtaining a request containing the user information from the terminal device, in response to the request, first transmitting the authentication information associated with the request to the terminal device, second obtaining target communication device information indicating a target device and the authentication information received by the terminal device from the target communication device, and when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device.

DESCRIPTION

The server can manage various information related to a communication device. For example, the server can manage service information indicating services to be provided to a user of the communication device. The services can be various services, such as, for example, a service for shipping consumables used by the communication device, a service for providing cloud storage for the use of the communication device, and the like. There was room for ingenuity in relating such service information to the communication device.

FIGS. 2A-2E show an example of tables.

FIGS. 9A and 9B show an example of tables.

A. EMBODIMENT

A1. Configuration of Device

Figure 1:
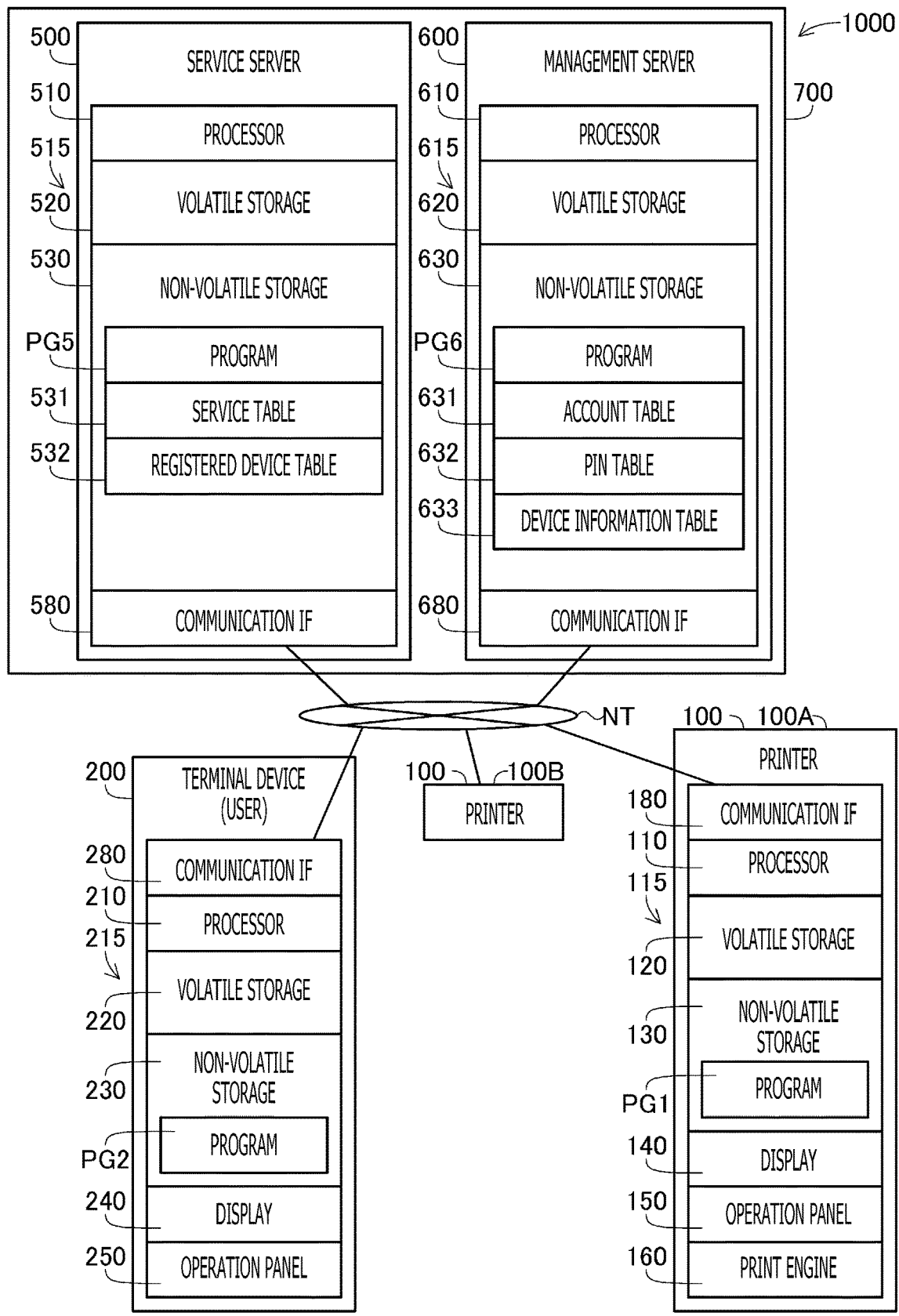
FIG. 1 is a block diagram showing a configuration of a device information management system.

FIG. 1 is a block diagram of a device information management system (hereinafter referred to as a "system") 1000 according to a present embodiment. The system 1000 includes printers 100A and 100B, a terminal device 200, and a processing server system 700 (hereinafter, the processing server system 700 is referred to simply as a "processing server 700"). The processing server 700 includes a service server 500 and a management server 600. In the present embodiment, the printers 100A and 100B have the same hardware configuration. Hereafter, when it is not necessary to describe the printers 100A and 100B in a distinguished manner, the alphabetic characters at the ends of the reference numbers are omitted, and they are referred to as printers 100. The processing server 700 is provided by a printing service provider. The printing service provider provides the printers 100 to users who have contracted for printing services. In the following description, printers 100A and 100B are assumed to be provided to the same user.

The printer 100 has a print engine 160. The print engine 160 is a device configured to print images using printing material (e.g., toner or ink) on printing sheets (an example of a printing medium) or other sheets using a particular method (e.g., an electrophotographic imaging method or an inkjet method). In the present embodiment, the print engine 160 is an inkjet printing device that uses ink. A printing service provider ships consumables (in this case, ink) used by the printer 100 to users who have contracted for printing services. The printing services provided by the printing service provider may include various services, such as a usage-based service where the cost is determined based on the number of sheets printed, a fixed-fee service (also known as a subscription service) where the user can print up to a particular number of printable sheets within a particular period of time with a fixed fee, and the like.

The terminal device 200 is a terminal device used by the user of the printer 100, and an example of the terminal device is a computer (e.g., smartphone, personal computer, etc.). The user of the printer 100 may be a variety of people. For example, if the printer 100 is used in a home, the user may be family members. If a company contracts for the service, the user may be an employee.

In the present embodiment, the user of the printer 100 registers the printer 100 with the processing server 700 for management by the processing server 700. In order to register the printer 100, the processing server 700 executes a registration process, which is described below.

The devices 100A, 100B, 200, 500, 600 shown in FIG. 1 are connected to a network NT. The network NT may include the Internet. Optionally, the network NT may include a so-called local network.

The printer 100 has a processor 110, a storage 115, a display 140, an operation panel 150, the print engine 160, and a communication IF (interface) 180. These components are connected to each other via a bus. The storage 115 includes a volatile storage 120 and a non-volatile storage 130. The processor 110 is a data processing device, e.g., a CPU. The volatile storage 120 is, for example, a DRAM, and the non-volatile storage 130 is, for example, a flash memory.

The display 140 is a device that displays images, such as an LCD, an OLED, or an LED display. The operation panel 150 is a device that receives operations by the user, an is provided with buttons, levers, and a touch panel overlaid on the display 140. The communication IF 180 is an interface for communicating with other devices. For example, the communication IF 180 includes one or more of a USB interface, a wired LAN interface, and an IEEE 802.11 wireless interface. In the present embodiment, the communication IF 180 is connected to the network NT.

The non-volatile storage 130 stores a program PG1. The program PG1 has been stored, in advance, in the non-volatile storage 130 as firmware by the manufacturer of the printer 100. The processor 110 executes the program PG1 to perform various processes described below.

The terminal device 200 has a processor 210, a storage 215, a display 240, an operation panel 250, and a communication IF 280, which are interconnected through a bus. The storage 215 includes a volatile storage 220 and a non-volatile storage 230. The processor 210 is a data processing device, which is, for example, a CPU. The volatile storage 220 is, for example, a DRAM, and the non-volatile storage 230 is, for example, a flash memory.

The display 240 is a device such as an LCD, an OLED display, or an LED display to display images. The operation panel 250 is a device that receives operations by the user, and is provided with buttons, levers, and a touch panel superimposed on the display 240. The communication IF 280 is an interface for communicating with other devices (e.g., the communication IF 280 includes one or more of a USB interface, a wired LAN interface, and an IEEE 802.11 wireless interface). In the present embodiment, the communication IF 280 is connected to the network NT.

The non-volatile storage 230 stores a program PG2. The processor 210 executes various processes described below by executing the program PG2.

The servers 500 and 600 have processors 510 and 610, storages 515 and 615, and communication interfaces 580 and 680, respectively. In each of the servers 500 and 600, the above components are interconnected through a bus. The storage 515 and 615 include volatile storages 520 and 620, and non-volatile storages 530 and 630, respectively. The processors 510 and 610 are data processing devices, which are, for example, CPUs. The volatile storages 520 and 620 are, for example, DRAMs, and the non-volatile storages 530 and 630 are, for example, flash memories. The communication IFs 580 and 680 are interfaces for communicating with other devices (e.g., each of the communication IFs 580 and 680 includes one or more of a USB interface, a wired LAN interface, and an IEEE 802.11 wireless interface). In the present embodiment, the communication IFs 580 and 680 are connected to the network NT.

In the non-volatile storages 530 and 630, programs PG5 and PG6 for the operation of the corresponding servers 500 and 600 are stored in advance, respectively. The processors 510 and 610 execute various processes described below by executing the programs PG5 and PG6, respectively.

The non-volatile storage 530 of the service server 500 further stores data of a service table 531 and a registered device table 532. The non-volatile storage 630 of the management server 600 further stores the data of an account table 631, a PIN table 632, and a device information table 633. Details of the above data (i.e., tables) will be described later.

A2. Configuration of Tables

FIGS. 2A-2E show examples of the tables 531, 532, 63, 632 and 633.

FIG. 2A shows an example of the service table 531. In the present embodiment, the service table 531 shows a correspondence relationship among a service account identifier SA, an email address AD, a password PW, and a management account identifier MA. The service account identifier SA is an identifier assigned to the user of the printer 100. The email address AD is an email address of the user. The password PW is information (e.g., a hash value of the password) used in a password authentication to proceed with the processing provided by the processing server 700. The management account identifier MA is an identifier assigned to the user.

As described below, the service account identifier SA is generated by the service server 500, and the management account identifier MA is generated by the management server 600. The management account identifier MA is shared by the service server 500 and the management server 600. The email address AD and the password PW are registered according to the information input by the user.

FIG. 2B shows an example of the registered device table 532. In the present embodiment, the registered device table 532 shows a correspondence relationship among the service account identifier SA, a PIN (Personal Identification Number) code, a serial number SN, and a plan identifier PL. The service account identifier SA is the same as the service account identifier SA in FIG. 2A. The PIN code is an example of the authentication information required for registration of the printer 100 (hereafter, the PIN code is also referred to simply as a PIN). The serial number SN is the serial number of the printer 100. The plan identifier PL is an identifier of the printing service. As described below, the PIN is generated by the management server 600. The plan identifier PL indicates the printing service selected by the user.

FIG. 2C shows an example of the account table 631. In the present embodiment, the account table 631 indicates the correspondence relationship between the management account identifier MA and the email address AD. The management account identifier MA is the same as the management account identifier MA in FIG. 2A. The email address AD is the same as the email address AD in the service table 531.

FIG. 2D shows an example of the PIN table 632. In the present embodiment, the PIN table 632 shows the correspondence relationship between the management account identifier MA, and the PIN. The management account identifier MA is the same as the management account identifier MA in FIG. 2A. The PIN is the same as the PIN in FIG. 2B.

FIG. 2E shows an example of the device information table 633. In the present embodiment, the device information table 633 shows the correspondence relationship among the serial number SN, the management account identifier MA, and the PIN. The serial number SN is the same as the serial number SN in FIG. 2B. The management account identifier MA is the same as the management account identifier MA in FIG. 2A. The PIN is the same as the PIN in FIG. 2B.

A3. Registration Process of First Printer 100A

FIGS. 3-6 are sequence charts showing an example of the registration process of the printer 100A. The registration process proceeds in the order of FIGS. 3-6. It is assumed that the registration process of the printer 100A is the first registration process (i.e., the registration process executed for the first time) for the user. As described below, the user performs a registration process of the printer 100B after the registration process of the printer 100A. Hereafter, the printer 100A, which is registered first, is also referred to as a first printer 100A, while the printer 100B, which is registered afterward, is also referred to as a second printer 100B.

The user installs the first printer 100A, turns on the power, and connects the first printer 100A to the network. Then, in S110, the user inputs an access instruction to the registration page by operating the operation panel 250 of the terminal device 200 (FIG. 1). The method of inputting the access instruction may be any method. For example, the user may enter the URL (Uniform Resource Locator) of the registration page to a browser running on the terminal device 200. In the present embodiment, the program PG2 of the terminal device 200 is a web browser program. The processor 210 of the terminal device 200 transmits a request for the registration page to the service server 500 by accessing the URL of the registration page. In S115, the processor 510 of the service server 500 transmits data of the registration page to the terminal device 200. The processor 210 of the terminal device 200 displays the registration page on the display 240 in accordance with the data of the registration page.

In S125, the user inputs user information to be registered with the processing server 700 by operating the operation panel 250 of the terminal device 200. In the present embodiment, the user information to be entered includes the user's email address and password. Hereinafter, it is assumed that the first email address AD1 and the first password PWa are entered. In S130, the processor 210 of the terminal device 200 transmits a user registration request to the service server 500. The user registration request contains data representing the entered user information (in this case, the information AD1 and PWa).

In S135, the processor 510 of the service server 500 generates the service account identifier SA in response to the user registration request. Hereinafter, it is assumed that the service account identifier SA to be generated is the first service account identifier SA1. In S140, the processor 510 transmits a management account generation request to the management server 600. The request contains the email address of the user (in this case, the first email address AD1).

Figure 3:
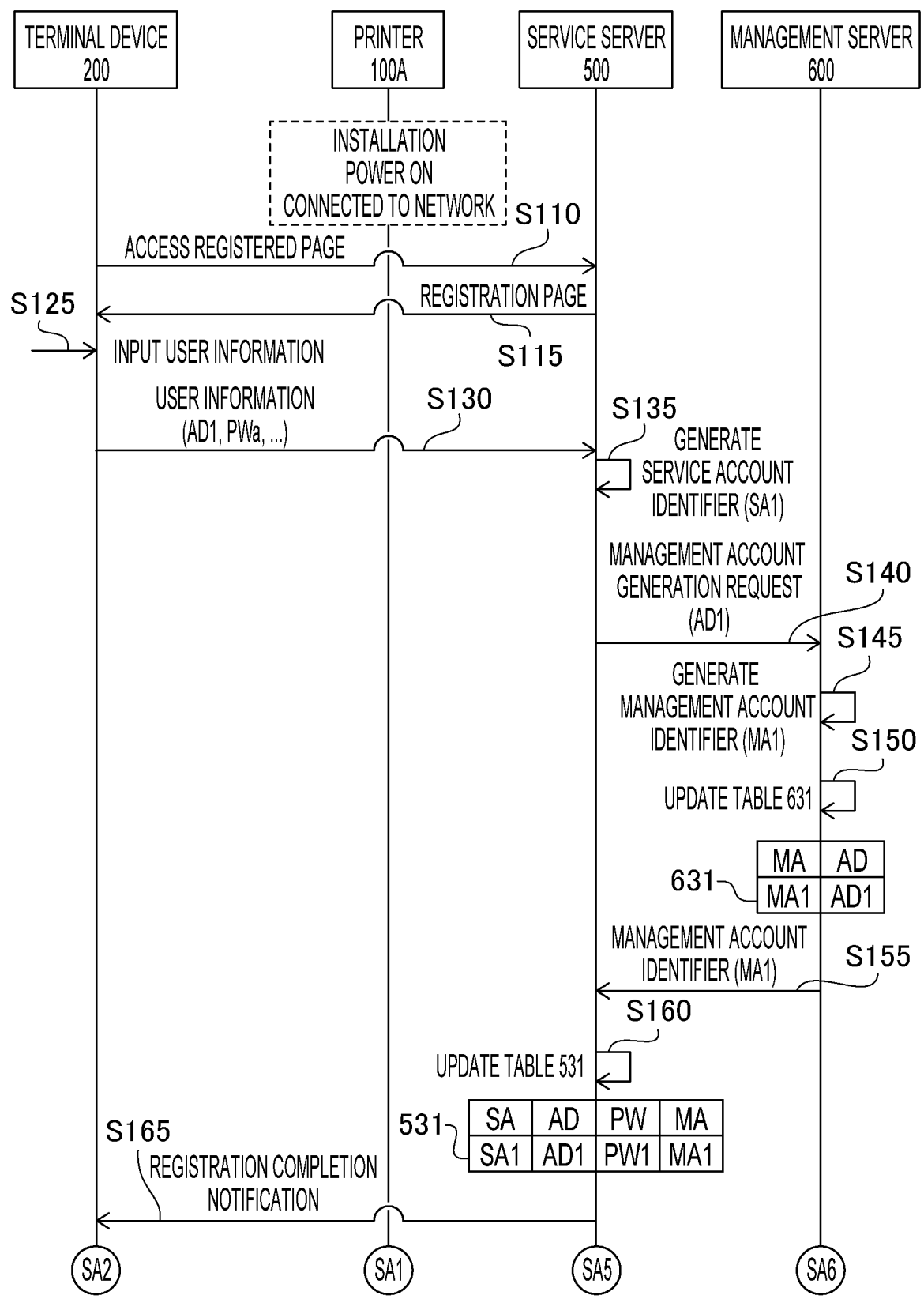
FIGS. 3-6 show sequence charts illustrating a registration process of a printer.

In S145, the processor 610 of the management server 600 generates the management account identifier MA in response to the management account generation request. Hereinafter, it is assumed that the generated management account identifier MA is the first management account identifier MA1. In S150, the processor 610 updates the account table 631. In FIG. 3, the updated account table 631 is shown. The processor 610 registers the correspondence relationship between the first email address AD1 obtained in S140 and the first management account identifier MA1 generated in S145 in the account table 631. The processor 610 stores the data representing the updated account table 631 in the non-volatile storage 630. In S155, the processor 610 transmits the registration completion notification to the service server 500. The notification contains data representing the generated management account identifier MA (in this case, the first management account identifier MA1).

In S160, the processor 510 of the service server 500 updates the service table 531. In FIG. 3, the updated service table 531 is shown. The processor 510 registers the correspondence relationship among the information SA1, AD1, PW1, and MA1 in the service table 531. The first service account identifier SA1 is information SA generated in S135, the first email address AD1 is information AD obtained in S130, the first password PW1 is the information PW corresponding to the first password PWa obtained in S130, and the first management account identifier MA1 is the information MA obtained in S155. The processor 510 stores the data representing the updated service table 531 in the non-volatile storage 530. In S165, the processor 510 transmits the registration completion notification to the terminal device 200. This notification contains data of the completion page indicating the completion of the registration of user information. The processor 210 of the terminal device 200 displays the completion page on the display 240 according to the completion page data. In the present embodiment, the completion page includes a user interface (e.g., a button, hyperlink, etc.) to proceed with the subsequent process.

In S210 (FIG. 4), the user inputs a proceeding instruction to proceed with the subsequent process by operating the operation panel 250 of the terminal device 200. The processor 210 of the terminal device 200 transmits a device registration request to the service server 500.

In S215, the processor 510 of the service server 500 transmits a PIN issuance request to the management server 600. This request contains data representing the management account identifier MA (in this case, the first management account identifier MA1) obtained in S155 (FIG. 3).

Figure 4:
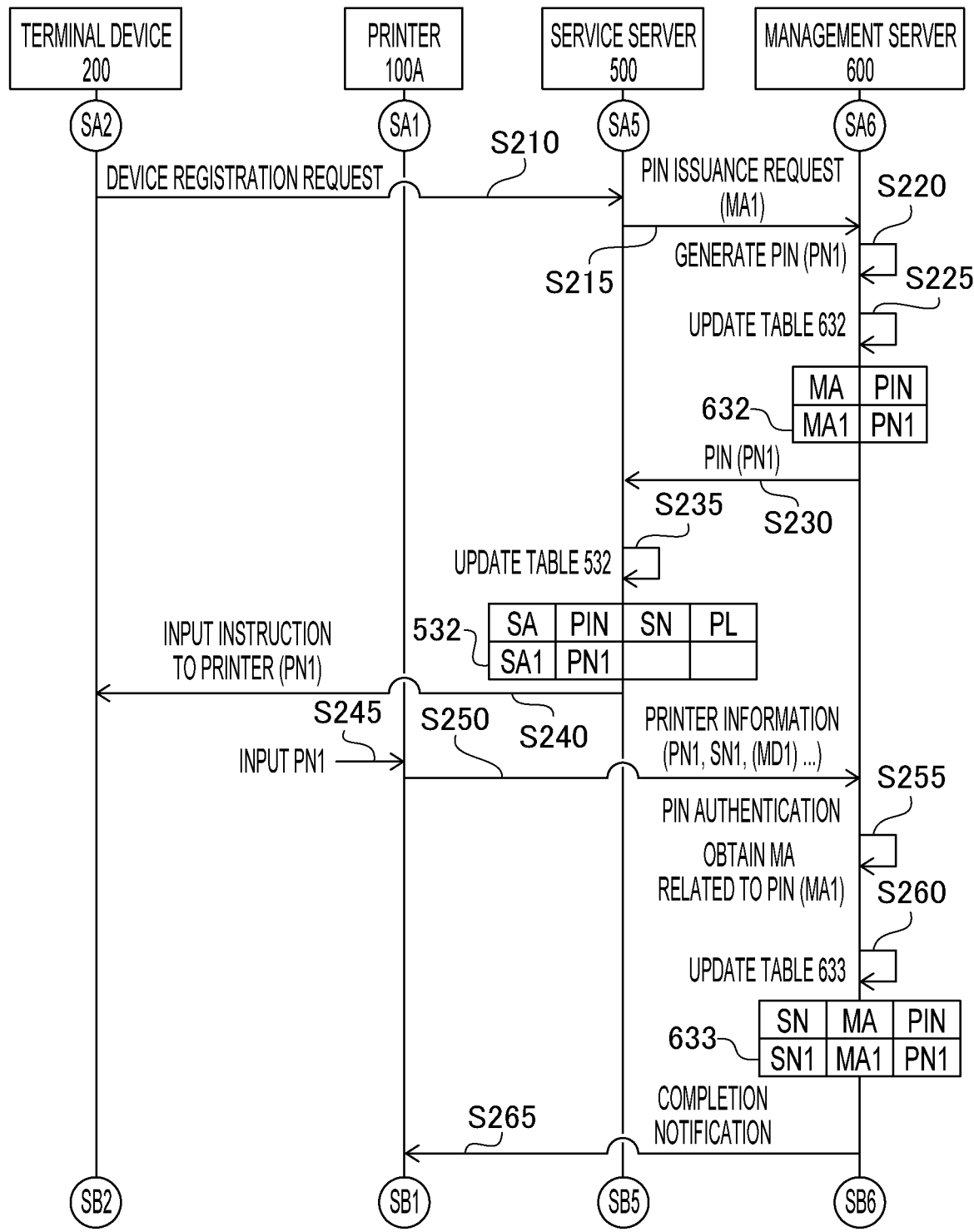

In S220, the processor 610 of the management server 600 generates the PIN. Hereinafter, it is assumed that the generated PIN is a first code PN1. In S225, the processor 610 updates the PIN table 632. In FIG. 4, the updated PIN table 632 is shown. The processor 610 registers the correspondence relationship between the first management account identifier MA1 obtained in S215 and the first code PN1 generated in S220 in the PIN table 632. The processor 610 stores data representing the updated PIN table 632 in the non-volatile storage 630. In S230, the processor 610 transmits data representing the generated PIN (in this case, the first code PN1) to the service server 500.

In S235, the processor 510 of the service server 500 updates the registered device table 532. In FIG. 4, the updated registered device table 532 is shown. The processor 510 registers the correspondence relationship between the first service account identifier SA1 generated in S135 (FIG. 3) and the first code PN1 obtained in S230 in the register device table 532. The serial number SN and the plan identifier PL have not been set. The processor 510 stores the data indicating the updated registered device table 532 in the non-volatile storage 530. In S240, the processor 510 transmits the data of an instruction page indicating the PIN (in this case, the first code PN1) to the terminal device 200. The instruction page indicates an instruction (e.g., a message) that prompts the user to enter the first code PN1 to the printer. The terminal device 200 displays the instruction page on the display 240 according to the data of the instruction page.

The user recognizes the first code PN1 by observing the displayed instruction page. In S245, the user inputs the first code PN1 by operating the operation panel 150 of the printer 100A. In S250, the processor 110 of the printer 100A transmits data representing printer information to the management server 600. The printer information contains the input first code PN1 and the serial number of the printer 100A (which is assumed to be the first serial number SN1). The printer information may further contain the model name of the printer 100A (which is assumed to be the first model name MD1). Hereafter, the printer information transmitted in S250 is also referred to as the first printer information. The data indicating the information SN1 and MD1 of the printer 100A are stored in advance in the non-volatile storage 130 of the printer 100A. The processor 110 refers to this data to obtain the information SN1 and MD1.

In S255, the processor 610 of the management server 600 authenticates the PIN obtained in S250 by referring to the PIN table 632. Although not shown in the drawings, when the obtained PIN is not registered in the PIN table 632, the processor 610 determines that the authentication has failed. In this case, the processor 610 aborts the registration process (e.g., the processor 610 notifies the printer 100A and the service server 500 of the abortion of the registration process). When the obtained PIN is registered in the PIN table 632, the processor 610 determines that PIN authentication has succeeded. In this case, in S255, the processor 610 references the PIN table 632 to obtain the management account identifier MA associated with the obtained PIN (in this case, the first management account identifier MA1 associated with the first code PN1).

In S260, the processor 610 updates the device information table 633. In FIG. 4, the updated device information table 633 is shown. The processor 610 registers the correspondence relationship among the information SN1, MA1 and PN1 in the device information table 633. The first serial number SN1 is the information SN obtained in S250, the first management account identifier MA1 is the information MA obtained in S255, and the first code PN1 is the PIN obtained in S250. In addition, a model name may also be registered in the device information table 633. The processor 610 stores the data indicating the updated device information table 633 in the non-volatile storage 630. In S265, the processor 610 transmits a completion notification to the printer 100A.

Figure 5:
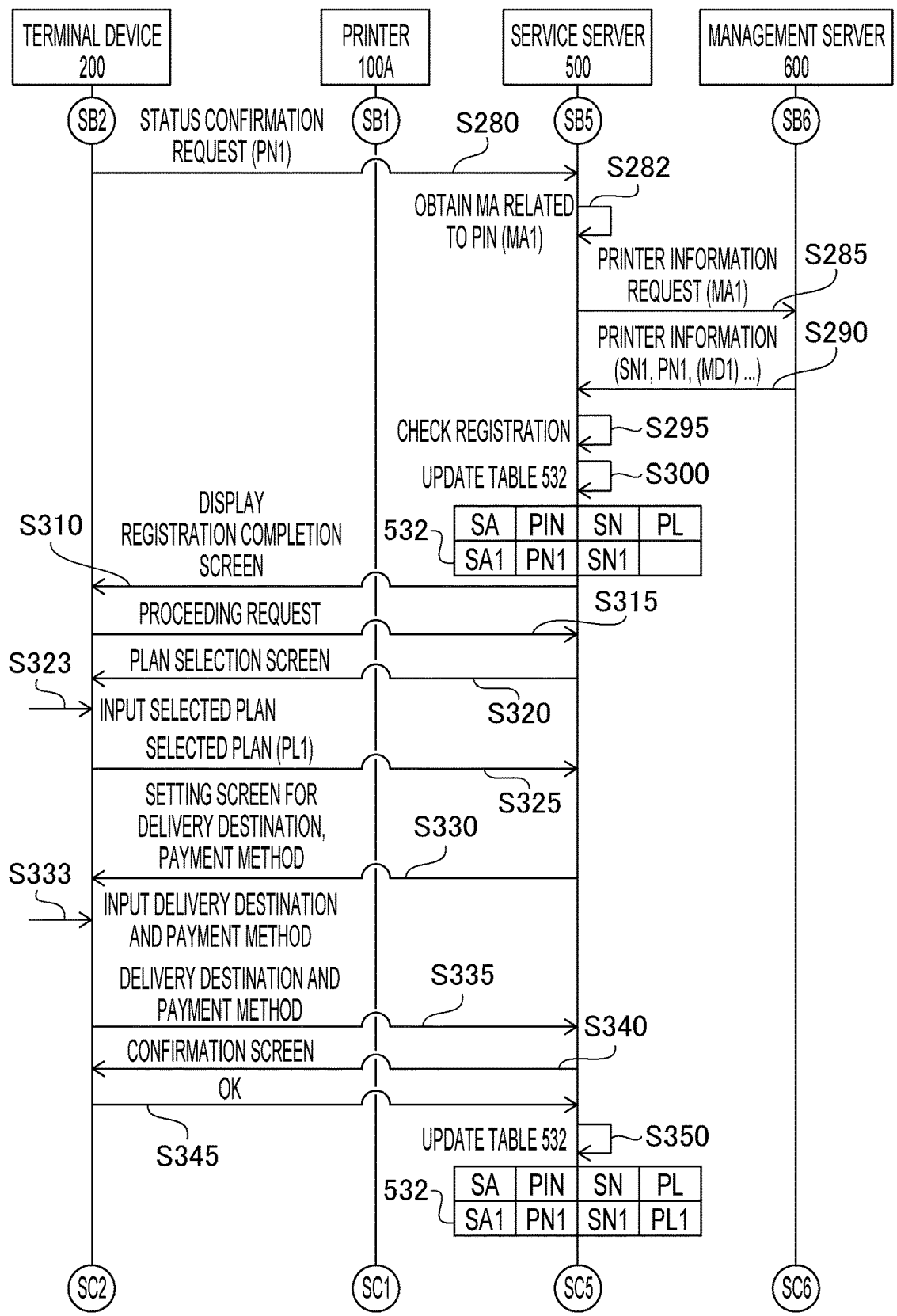

After S240 (FIG. 4), the processor 210 of the terminal device 200 transmits a status confirmation request to the service server 500 in S280 (FIG. 5). This request contains data representing the first code PN1, which is obtained in S240 (FIG. 4). Although not shown in the drawings, the processor 210 repeatedly transmits the status confirmation request until the registration of the printer 100A (in this case, the first serial number SN1) associated with the first code PN1 is confirmed.

In S282, the processor 510 of the service server 500 obtains the management account identifier MA associated with the first code PN1 obtained in S280 (in this case, the first management account identifier MA1). In the present embodiment, the processor 510 obtains the first service account identifier SA1 associated with the first code PN1 by referring to the registered device table 532 (FIG. 4). The processor 510 refers to the service table 531 (FIG. 3) to obtain the first management account identifier MA1 associated with the first service account identifier SA1.

In S285 (FIG. 5), the processor 510 transmits a printer information request to the management server 600. This request contains data indicating the first management account identifier MA1 obtained in S282.

In S290, the processor 610 of the management server 600 transmits data representing the printer information associated with the first management account identifier MA1 obtained in S285 to the service server 500. The processor 610 refers to the device information table 633 (FIG. 4) to obtain the printer information associated with the first management account identifier MA1 (hereinafter also referred to as the second printer information). In the present embodiment, the second printer information contains the correspondence relationship between the information SN1 and PN1. When the device information table 633 further stores a model name, the second printer information may further contain the model name of the printer (in this case, the first model name MD1).

In S295, the processor 510 of the service server 500 refers to the second printer information obtained in S290 to check whether a serial number SN of the printer is associated with the first code PN1. The processor 510 determines that the serial number SN is associated with the first code PN1 when the second printer information representing the correspondence relationship between the first code PN1 and the serial number SN (in this case, the first serial number SN1) is obtained.

In S300, the processor 510 updates the registered device table 532. In FIG. 5, the updated registered device table 532 is shown. The processor 510 registers the first serial number SN1 associated with the first code PN1 by the second printer information obtained in S290 in the registered device table 532. The updated registered device table 532 shows the correspondence relationship among the information SA1, PN1, and SN1.

In S310, the processor 510 transmits data representing the registration completion screen to the terminal device 200. The processor 210 of the terminal device 200 displays the registration completion screen on the display 240 according to the received data. In the present embodiment, the registration completion screen includes a user interface (e.g., buttons, hyperlinks, etc.) for proceeding with subsequent processes.

In S315, the user inputs a proceeding instruction for the subsequent processes by operating the operation panel 250 of the terminal device 200. The processor 210 of the terminal device 200 transmits the proceeding request to the service server 500.

In S320, the processor 510 of the service server 500 transmits the data of the plan selection screen to the terminal device 200. The plan selection screen shows a list of multiple printing services that can be contracted. The list of multiple printing services can include various printing services, such as multiple usage-based printing services with different unit prices, multiple flat-rate printing services with different numbers of printable sheets, and so on. The processor 210 of the terminal device 200 displays the plan selection screen on the display 240 according to the received data.

In S323, the user selects a printing service by referring to the plan selection screen. Hereinafter, it is assumed that the printing service with a first plan identifier PL1 is selected (the selected printing service is referred to as the selected plan). It is further assumed that the printing service with the first plan identifier PL1 is a printing service that includes shipping of consumables. The user inputs information indicating a selected plan by operating the operation panel 250 of the terminal device 200. In S325, the processor 210 of the terminal device 200 transmits the data indicating the selected plan to the service server 500.

In S330, the processor 510 of the service server 500 transmits, to the terminal device 200, data representing a setting screen for the delivery destination of the consumables and the payment method of the fees. The processor 210 of the terminal device 200 displays the setting screen on the display 240 according to the received data.

In S333, the user inputs a delivery destination and the payment method by operating the operation panel 250 of the terminal device 200. In S335, the processor 210 of the terminal device 200 transmits data indicating the delivery destination and the payment method to the service server 500.

In S340, the processor 510 of the service server 500 transmits the data representing the confirmation screen to the terminal device 200. In the present embodiment, the confirmation screen includes a user interface (e.g., buttons, hyperlinks, etc.) for selecting whether or not to accept the entered information (including the plan, delivery destination, and payment method).

It is assumed that the user selects to accept the information. In such a case, in S345, the processor 210 of the terminal device 200 transmits data indicating the acceptance to the service server 500. In S350, the processor 510 of the service server 500 registers the input information. In the present embodiment, the processor 510 registers the first plan identifier PL1, which indicates the selected plan obtained in S325, with the second printer information (in this case, SN1 and PN1) obtained in S290, in the register device table 532. in FIG. 5, the updated registered device table 532 is shown. The registered device table 532 stores the correspondence relationship among the information SA1, PN1, SN1 and PL1. The processor 510 stores data representing the updated registered device table 532 in the non-volatile storage 530. Although not shown in the drawings, the processor 510 registers the delivery destination and the payment method in a table not shown in the drawings. The registered device table 532 may store the delivery destination and the payment method in addition to the plan identifier PL.

Although not shown in the drawings, when the user selects rejection on the confirmation screen in S340, the processor 510 of the service server 500 causes the terminal device 200 to display the screen for modifying information. The user modifies the information by operating the operation panel 250. The user then selects to accept the information, and the processor 210 of the terminal device 200 executes S345.

When the update of the device information table 633 (FIG. 4: S260) has not been completed at the time of receipt of the printer information request (FIG. 5: S285), the device information table 633 does not contain the printer information associated with the first management account identifier MA1. In such a case, the second printer information transmitted in S290 does not represent the serial number SN associated with the first code PN1. The processor 510 of the service server 500 determines in S295 that the serial number SN of the printer is not associated with the first code PN1. In such a case, the processor 510 skips S300. Instead of transmitting data representing the registration completion screen (S310), the processor 510 transmits data indicating that the printer is not registered to the terminal device 200. The processor 210 of the terminal device 200 repeats the transmission of the status confirmation request (S280) until the data of the registration completion screen is received.

After S350, in S363 (FIG. 6), the processor 510 of the service server 500 transmits a periodical remaining amount transmission request to the management server 600. This request contains data representing the first serial number SN1 of printer 100A. In S365, the processor 610 of the management server 600 transmits a periodical remaining amount transmission request to the printer 100A associated with the first serial number SN1 obtained in S363. In S368, the processor 610 transmits the completion notification to the service server 500. It is noted that S360 in FIG. 6 refers to the entirety of S363, S365, and S368. In S375, the processor 510 of the service server 500 transmits a service registration completion notification to the terminal device 200. Then, the registration process is terminated. As described above, in the first registration process for the user, the user enters various information, such as the selected plan (FIG. 5: S323), into the terminal device 200.

Figure 6:
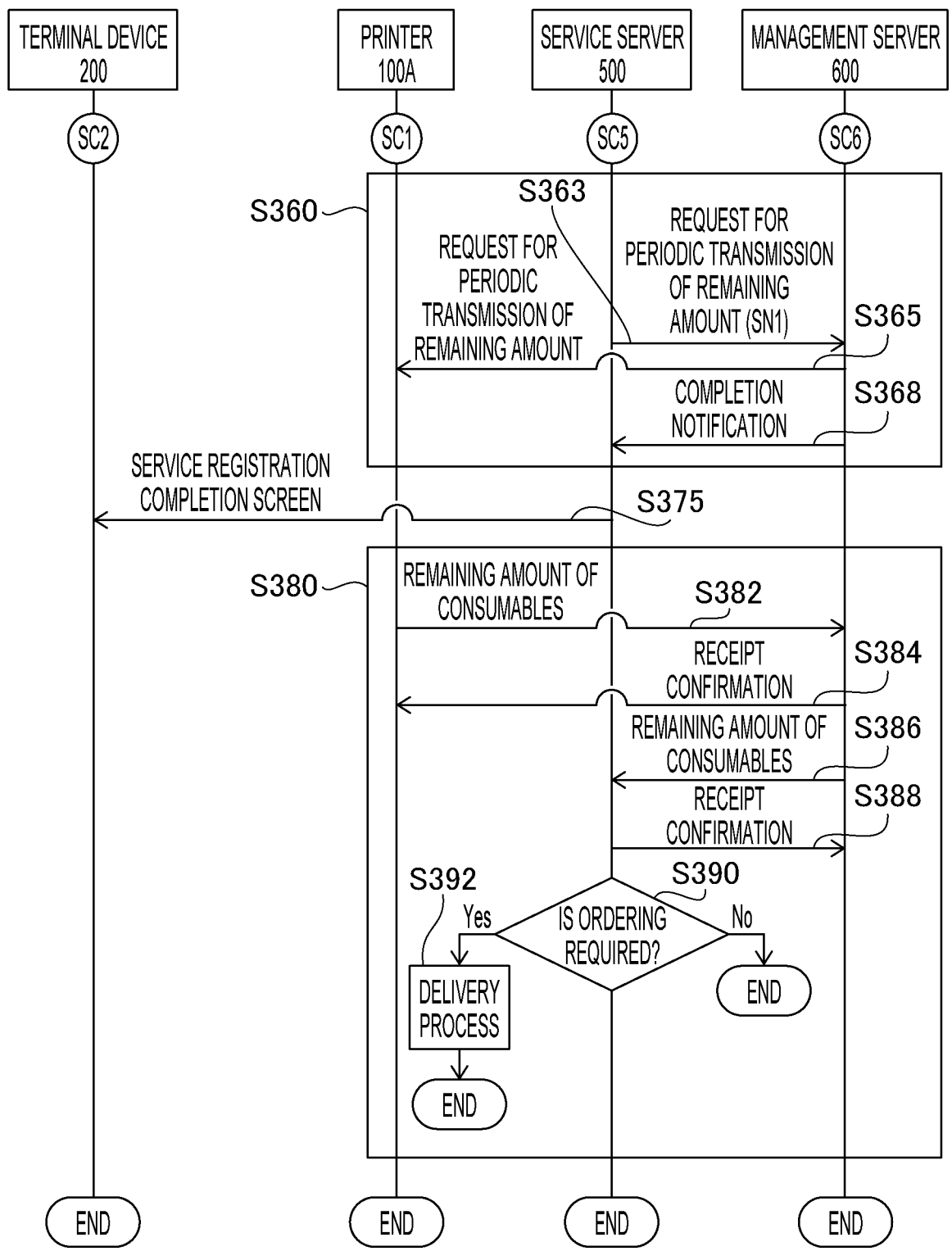

After receiving the periodic remaining amount transmission request (FIG. 6: S365), the processor 110 of the printer 100A periodically notifies the management server 600 of the remaining amount of consumables (in the present embodiment, the remaining amount of ink) (S382). In response to this notification, the servers 500 and 600 (i.e., the processing server 700) execute a process to control the ordering of consumables. Concretely, in S384, the processor 610 of the management server 600 transmits a receipt confirmation of the notification to the printer 100A. In S386, the processor 610 notifies the service server 500 of the remaining amount of consumables. In S388, the processor 510 of the service server 500 transmits a receipt confirmation of the notification to the management server 600.

In S390, the processor 510 of the service server 500 determines whether ordering of consumables is required. In the present embodiment, the processor 510 determines that ordering is required when the remaining amount of consumables is equal to or less than a particular threshold value. When it is not determined that an order is required (S390: NO), the process of controlling the order is terminated. When it is determined that an order is required (S390: YES), in S392, the processor 510 executes a delivery process. The delivery process may be any process for shipping consumables to the user. For example, the processor 510 transmits an instruction to a sales company server, not shown, to ship the consumables to the delivery destination. The sales company server proceeds with the procedure for shipping the consumables in response to the instructions. After S392, the process of controlling the order is terminated. Hereafter, the entirety of S382-S392 is referred to as an order control process S380. The processor 110 of the printer 100A may notify the management server 600 of the remaining amount of consumables in response to consuming consumables, rather than periodically.

A4. Registration Process for Second Printer 100B

Figure 7:
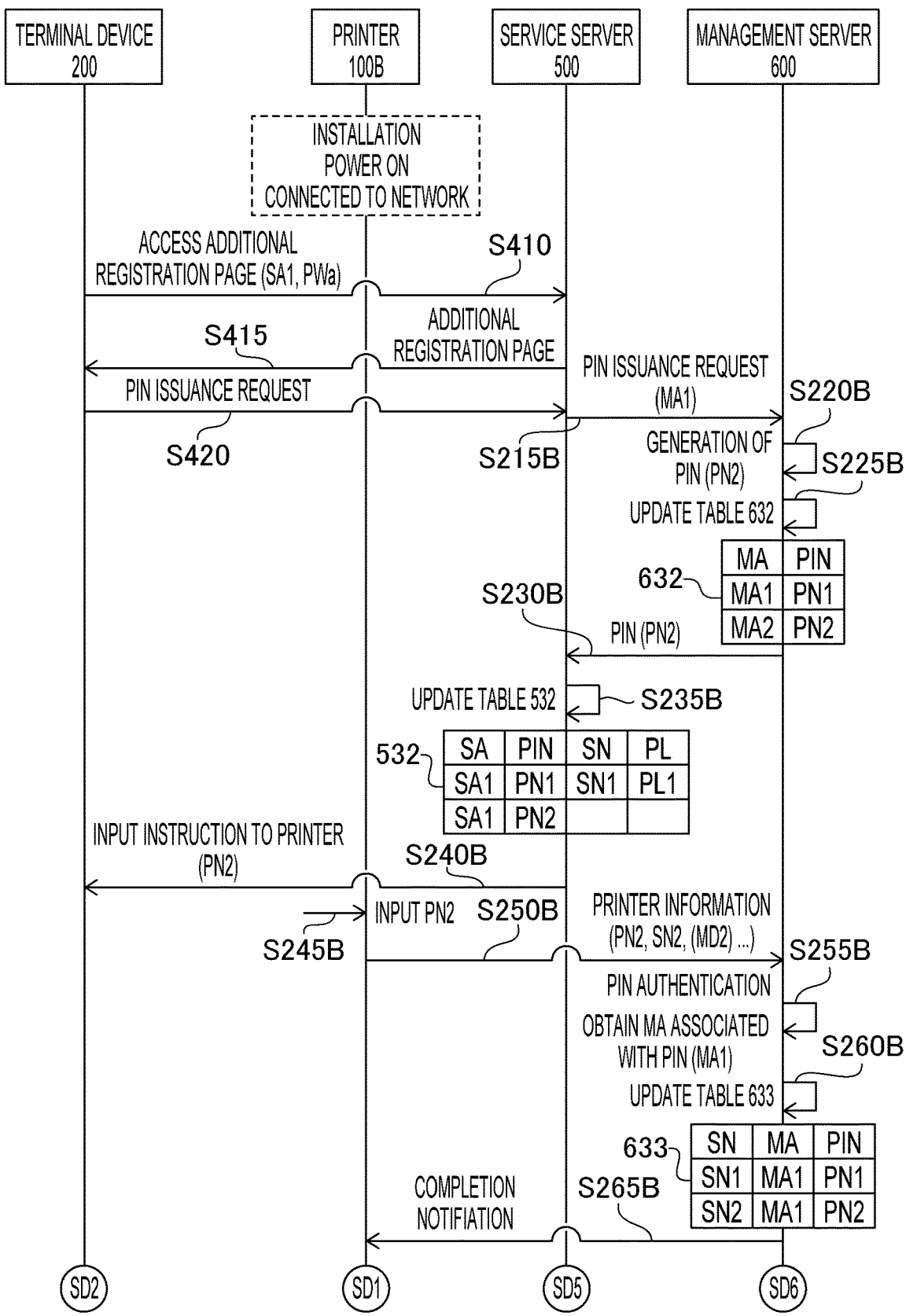
FIGS. 7 and 8 show sequence charts illustrating a registration process of a second printer.
Figure 8:
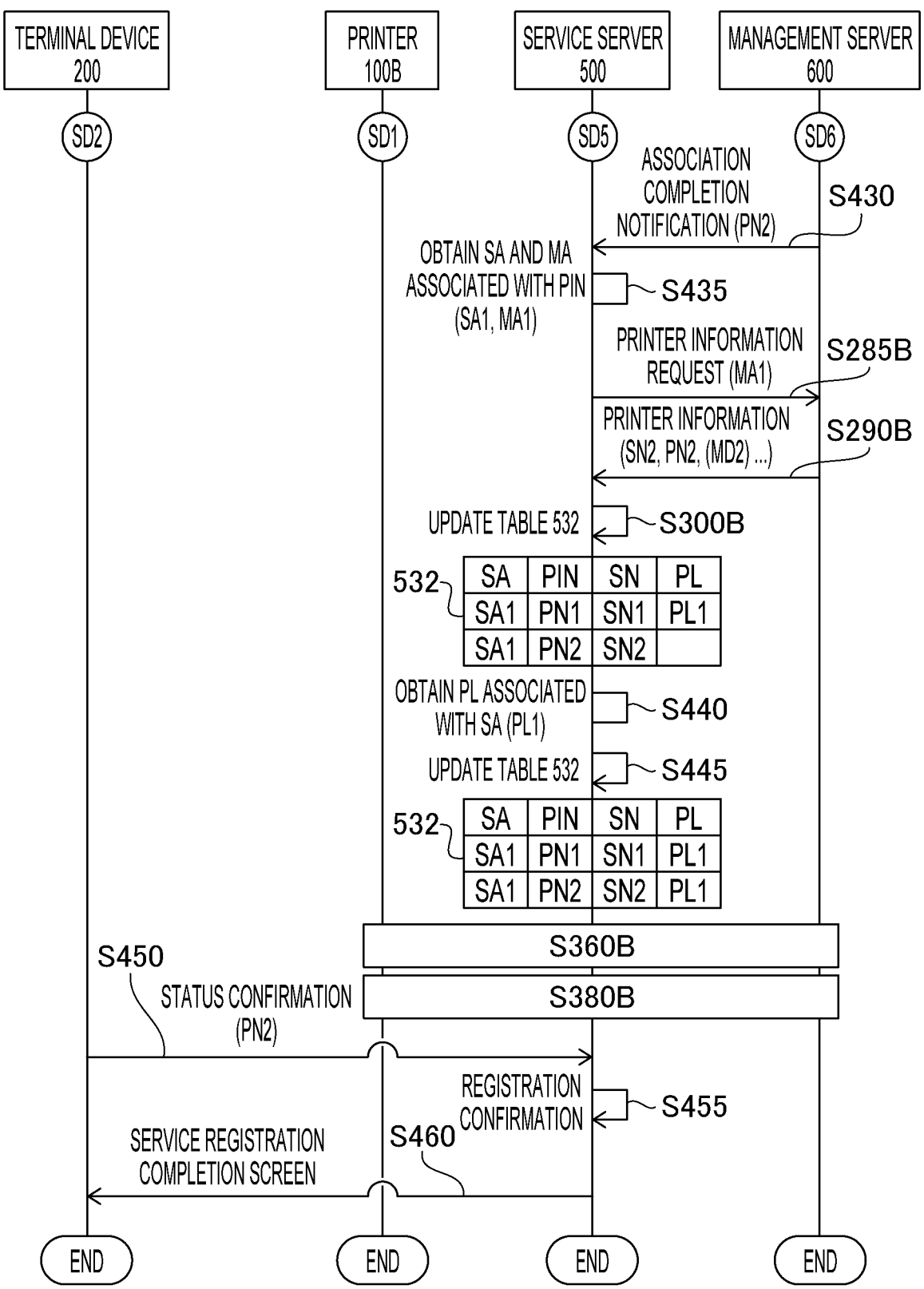

FIGS. 7-8 are sequence charts showing an example of a registration process for the second printer 100B. The registration process proceeds in the order of FIGS. 7-8. It is assumed that the registration process for the second printer 100B is performed after the registration process for the first printer 100A (FIGS. 3-6). In the registration process for the second printer 100B, the information used in the registration process for the first printer 100A is reused.

The user installs the second printer 100B, turns on the power, and connects the second printer 100B to the network. Then, in S410, the user enters an instruction to access the additional registration page by operating the operation panel 250 of the terminal device 200 (FIG. 1). Access to the additional registration page indicates a request to register the printer. The URL of the additional registration page is determined in advance. In the present embodiment, access to the additional registration page requires authentication with the service account identifier SA (FIG. 2A) and the password PW. The user inputs the first service account identifier SA1 and the first password PWa. The processor 210 of the terminal device 200 transmits an access request containing data indicating the input information SA1 and PWa to the service server 500.

In S415, the processor 510 of the service server 500 authenticates the information SA1 and PWa by referring to the service table 531 (FIG. 2A). Although not shown in the drawings, when the authentication is failed, the processor 510 transmits a notification of the authentication failure to the terminal device 200. When the authentication succeeds, at S415, the processor 510 transmits the data of the additional registration page to the terminal device 200. The processor 210 of the terminal device 200 displays the additional registration page on the display 240 according to the data of the additional registration page. The additional registration page includes a user interface (e.g., buttons, hyperlinks, etc.) to proceed with the subsequent processes (in this case, PIN issuance).

In S420, the user inputs a proceeding instruction to proceed to the next step of the process by operating the operation panel 250 of the terminal device 200. The processor 210 of the terminal device 200 transmits a PIN issuance request to the service server 500.

The subsequent steps of S215B-S265B are the same as the steps S215-S265 in FIG. 4, respectively, except that the information PN2 and SN2 for the second printer 100B and the second printer 100B are used instead of the information PN1 and SN1 for the first printer 100A. The step numbers of these steps in FIG. 7 are the step numbers of the corresponding steps in FIG. 4 with the letter "B" added to the end.

The PIN issuance request in S215B contains data indicating the first management account identifier MA1, which is associated by the service table 531 (FIG. 2A) with the first service account identifier SA1 that has already been authenticated in S410 and S415. In S220B, the processor 610 generates a new PIN (the second code PN2 is assumed to be generated). In S225B, the processor 610 adds the correspondence relationship between the information MA1 and PN2 to the PIN table 632. FIG. 7 shows the updated PIN table 632. The PIN table 632 stores the correspondence between MA1 and PN1 and MA1 and PN2. In S230B, the management server 600 notifies the service server 500 of the second code PN2.

In S235B, the processor 510 registers the correspondence relationship between the first service account identifier SA1, which has already been authenticated in S410 and S415, and the second code PN2, which was obtained in S230B, in the registering device table 532. In FIG. 7, the updated Registrar Table 532 is shown. The registered device table 532 stores the correspondence relationship among SA1, PN1, SN1, and PL1, and the correspondence relationship between SA1 and PN2. Other information SN and PL associated with SA1 and PN2 are not set. In S240B, the processor 510 transmits the data of the instruction page indicating the second code PN2 to the terminal device 200.

In S245B, the user inputs the second code PN2 to the printer 100B. In S250B, the processor 110 of the printer 100B transmits data indicating printer information to the management server 600. The printer information contains the second code PN2 entered in S245B and the serial number of the printer 100B (which shall be the second serial number SN2). The printer information may further contain the model name of the printer 100B (which is assumed to be the second model name MD2).

In S255B, the processor 610 authenticates the second code PN2 obtained in S250B by referring to the PIN table 632. In the example in FIG. 7, the authentication is successful. The processor 610 obtains the first management account identifier MA1 associated with the second code PN2 by the PIN table 632. In S260B, the processor 610 registers the correspondence relationship among the information SN2, MA1, and PN2 in the device information table 633. The information SN2 and PN2 are the information obtained in S250B, the first management account identifier MA1 is the information MA obtained in S255B, and FIG. 7 shows the updated device information table 633. The device information table 633 stores the correspondence relationship among SN1, MA1, and PN1, and the correspondence relationship among SN2, MA1, and PN2. In S265B, the processor 610 transmits the completion notification to the printer 100B.

In S430 (FIG. 8), the processor 610 of the management server 600 transmits the association completion notification to the service server 500. This notification contains data indicating the second code PN2, which is obtained in S250B (FIG. 7).

In S435, the processor 510 of the service server 500 obtains the information SA1 and MA1 associated with the second code PN2 obtained in S430. The first service account identifier SA1 is associated with the second code PN2 by the registered device table 532 (FIG. 7). The first management account identifier MA1 is associated with the first service account identifier SA1 (and thus with the second code PN2) by the service table 531 (FIG. 2A).

The following steps of S285B, S290B, and S300B are the same as S285, S290, and S300 in FIG. 5, respectively, except that the first printer 100A and the information PN1 and SN1 of the first printer 100A are used instead of the second printer 100B and the information PN2 and SN2 of the second printer 100B. The step numbers for these steps in FIG. 8 are the step numbers for the corresponding steps in FIG. 5 with the letter "B" added to the end.

The request in S285B contains data representing the first management account identifier MA1 obtained in S435. In S290B, the processor 610 transmits the printer information associated with the first management account identifier MA1 to the service server 500. The printer information is the information associated with the first management account identifier MA1 by the device information table 633 (FIG. 7). The printer information contains the correspondence relationship between SN2 and PN2. In S300B (FIG. 8), the processor 510 updates the registered device table 532 to show the correspondence relationship between the information SN2 and PN2, which is obtained in S290B. In FIG. 8, the updated registered device table 532 is shown. SN2 is associated with the correspondence relationship between the registered SA1 and PN2.

In S440, the processor 510 refers to the registered device table 532 to obtain the first plan identifier PL1 associated with the first service account identifier SA1 obtained in S435. In S445, the processor 510 associates the first plan identifier PL1 obtained in S440 with the second code PN2 obtained in S430 and registers the correspondence relationship in the registered device table 532. In FIG. 8, the updated registered device table 532 is shown. The registered device table 532 contains the correspondence relationship among SA1, PN1, SN1, and PL1, and the correspondence relationship among SA1, PN2, SN2, and PL1.

The subsequent process of S360B is the same as the process of S360 in FIG. 6, except that the second printer 100B and the second serial number SN2 are used instead of the first printer 100A and the first serial number SN1. The process of S380B following S360B is the same as the process of the order control process S380 in FIG. 6, except that the second printer 100B is used instead of the first printer 100A. The processor 110 of the second printer 100B periodically notifies the management server 600 of the remaining amount of consumables. This causes the order control process S380B for the consumables of the second printer 100B to be executed repeatedly. As described above, in the present embodiment, the first plan identifier PL1 (FIG. 8: the registered device table 532) indicates the printing service that contains the shipping of consumables. The same first plan identifier PL1 is then associated with both the first serial number SN1 and the second serial number SN2. Therefore, the shipment of consumables for the first printer 100A and the shipment of consumables for the second printer 100B are performed according to the same printing service.

In S450, the processor 210 of the terminal device 200 transmits a status confirmation request to the service server 500. This request contains data representing the second code PN2, which is obtained in S240B (FIG. 7). In S455, the processor 510 of the service server 500 refers to the registered device table 532 to confirm that the serial number SN and the plan identifier PL of the printer associated with the second code PN2 have already been registered. In S460, the processor 510 transmits a completion notification of the service registration to the terminal device 200. The registration process is then terminated.

Although not shown in the drawings, if the update (S445) of the registered device table (S432) has not been completed at the time of receipt of the status confirmation request (S450), the registered device table (S445) does not store the second code PN2 The registered device table 532 does not store one or both of the serial number SN and the plan identifier PL to be associated with the second code PN2. In such a case, the processor 510 transmits data indicating that the printer is unregistered to the terminal device 200 instead of transmitting data of the registration completion screen (S460). The processor 210 of the terminal device 200 repeats transmitting the status confirmation request (S450) until the registration completion screen data is received.

In this way, the first plan identifier PL1 selected in the preceding registration process for the first printer 100A is associated with the second printer 100B. Since the user's re-selection of a plan is omitted, the burden on the user is greatly reduced.

As described above, in the present embodiment, the printers 100A and 100B (FIG. 1) are configured to communicate with other devices (e.g., the processing server 700) via the network NT. Such printers 100A and 100B are examples of a communication device (hereafter, printers 100A and 100B are also referred to as communication devices 100A and 100B).

The processing server 700 performs the following processes. Through the process including S235 in FIGS. 4, S300 and S350 in FIG. 5, and S235B in FIG. 7, the service server 500 associates the first service account identifier SA1, the first plan identifier PL1, and the second code PN2 with each other and registers the same in the non-volatile storage 530 (concretely, in the registered device table 532). The first service account identifier SA1 is an identifier assigned to a user of the communication device 100 and is an example of user information indicating the user. The first plan identifier PL1 is an example of first service information indicating a first service to be provided to the user. The second code PN2 is an example of authentication information. As indicated in the registered device table 532 shown in FIG. 7, the second code PN2 is associated with the first service account identifier SA1, and the first service account identifier SA1 is associated with the first plan identifier PL1. When the plan identifier PL directly associated with the second code PN2 is not yet set, the first plan identifier PL1 is available for use as the plan identifier PL associated with the second code PN2 via the first service account identifier SA1.

In S410 (FIG. 7), the service server 500 obtains a registration request including the first service account identifier SA1 from the terminal device 200. In S240B, the service server 500 transmits the second code PN2 associated with the first service account identifier SA1 included in the registration request to the terminal device 200 in response to the registration request. In S250B, the management server 600 obtains the second serial number SN2 and the second code PN2 from the second communication device 100B. In S250B, the management server 600 obtains the second serial number SN2 and the second code PN2 from the second communication device 100B. The second serial number SN2 is an example of communication device information indicating the second communication device 100B. The second code PN2 is an example of authentication information received by the terminal device 200. The second code PN2 obtained by the management server 600 is information transmitted by the second communication device 100B based on the second code PN2 received by the terminal device 200. In the present embodiment, in S240B, the terminal device 200 displays the received second code PN2 on the display 240. In S245B, the user observes the second code PN2 displayed by the terminal device 200 and inputs the second code PN2 into the second communication device 100B. In this way, the second code PN2 is transmitted by the user from the terminal device 200 to the second communication device 100B. The second communication device 100B is configured to receive the second code PN2 that is received by the terminal device 200. Concretely, the second communication device 100B is configured to receive the second code PN2 according to an instruction by the user (in this case, by operating the operation panel 150).

Through the process including S235B in FIGS. 7 and S300B and S445 in FIG. 8, the service server 500 associates the second serial number SN2 of the second communication device 100B with the first service account identifier SA1 and the first plan identifier PL1 and registers the same in the non-volatile storage 530 (concretely, the registered device table 532). The first service account identifier SA1 is the service account identifier SA to be associated with the second code PN2 (FIG. 7: S250B) obtained from the second communication device 100B. The first plan identifier PL1 is a plan identifier PL to be associated with the second code PN2 obtained from the second communication device 100B. In the present embodiment, the first plan identifier PL1 is associated with the second code PN2 via the first service account identifier SA1 (the registered device table 532 (FIG. 8)).

Thus, the processing server 700 can appropriately associate the second serial number SN2 of the second communication device 100B with the first plan identifier PL1.

Prior to the registration of the second serial number SN2 of the second communication device 100B through the process including S235 in FIGS. 4, S300 and S350 in FIG. 5, and S235B in FIG. 7, the service server 500 associates the information SA1, PL1, PN2 and the first serial number SN1 indicating the first communication device 100A with each other and registers the same in the non-volatile storage 530. Through the process including S235B in FIGS. 7 and S300B and S445 in FIG. 8, the service server 500 associates the second serial number SN2 of the second communication device 100B with the first plan identifier PL1 and registers the same in the non-volatile storage 530 (concretely, the registered device table 532). Here, the first plan identifier PL1 is the plan identifier PL associated with the second code PN2 (FIG. 7: S250B) obtained from the second communication device 100B and which is also associated with the first serial number SN1. In this way, since the second serial number SN2 of the second communication device 100B is associated with the first plan identifier PL1 that is associated with the first serial number SN1 of the first communication device 100A, the processing server 700 can easily associate the second serial number SN2 with the first plan identifier PL1. Furthermore, the burden on the user for registration of the second communication device 100B is reduced. For example, in the registration process of the second communication device 100B, input of the selected plan by the user is omitted.

Further, in S320 of FIG. 5, the service server 500 transmits data that causes the terminal device 200 to display a list of multiple services to the terminal device 200. In S325, the service server 500 obtains a selected plan from the terminal device 200. The selected plan is an example of information indicating the selected service, which is a service selected from a plurality of services. The first plan identifier PL1 (FIG. 8: S445) associated with the second serial number SN2 indicates the selected plan. Thus, when the user selects a service, the first plan identifier PL1 can indicate the appropriate services (i.e., the services subject to be selected by the user).

Furthermore, when the first plan identifier PL1 is associated with the second communication device 100B, the printing service indicated by the first plan identifier PL1 is a service that includes shipping consumables used by the second communication device 100B. The processing server 700 can appropriately associate the second serial number SN2 of the second communication device 100B with the service including the shipping of consumables for the second communication device 100B.

B. MODIFIED EMBODIMENT

FIG. 9A and FIG. 9B show examples of tables 532a and 633a, respectively. The difference of the tables 532a and 633a in FIGS. 9A and 9B with respect to the tables 532 and 633 in FIGS. 2B and 2E is that the model name MD has been added. In the modified embodiment, the registration process for the first printer 100A is a modified version of the embodiment shown in FIG. 3-FIG. 6 with the following modifications. The printer information transmitted in S250 in FIG. 4 contains the model name MD of the first printer 100A (in this case, the first model name MD1). In S260, the first model name MD1 is registered in the device information table 633*a* (FIG. 9B) in association with the information SN1, MA1, and PN1. The printer information transmitted in S290 of FIG. 5 includes the first model name MD1. In S300, the first model name MD1 is registered in the registered device table 532*a* (FIG. 9A) in association with the information SA1, PN1, and SN1. The processing of the other parts of the registration process for the first printer 100A is the same as that of the corresponding parts of FIG. 3-FIG. 6.

Figure 10:
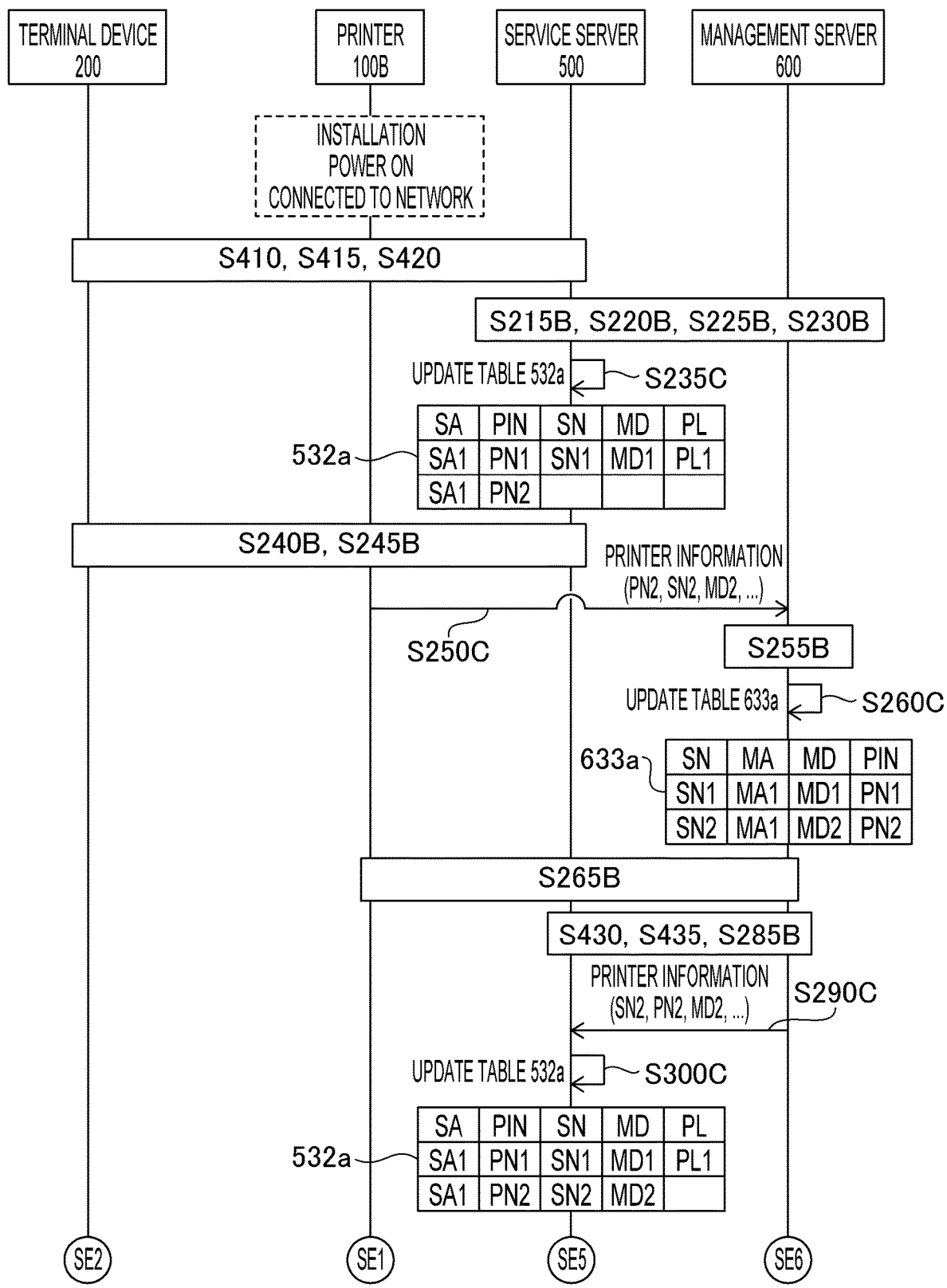
FIGS. 10-15 are sequence charts illustrating a registration process of the second printer.
Figure 11:
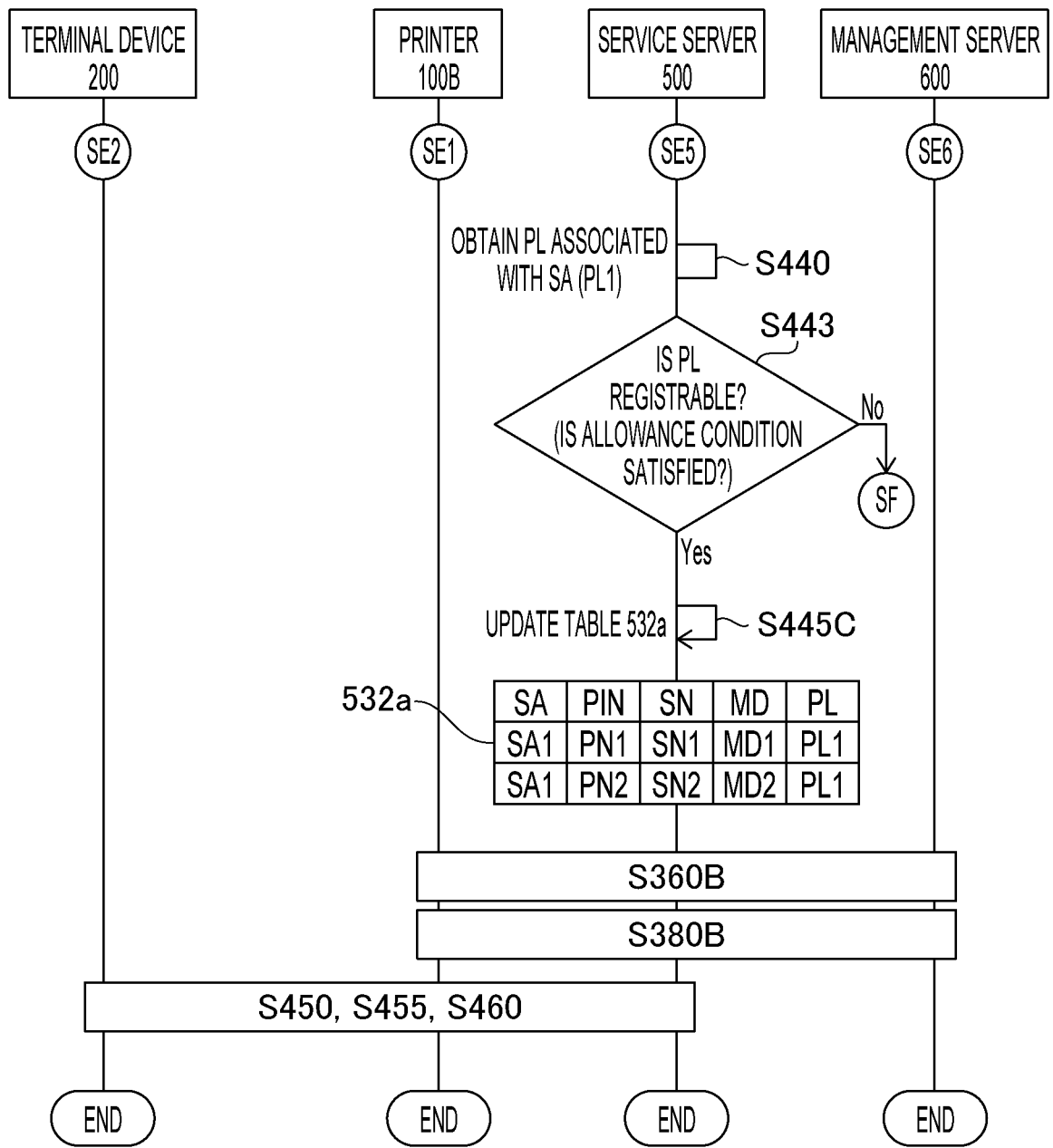
Figure 12:
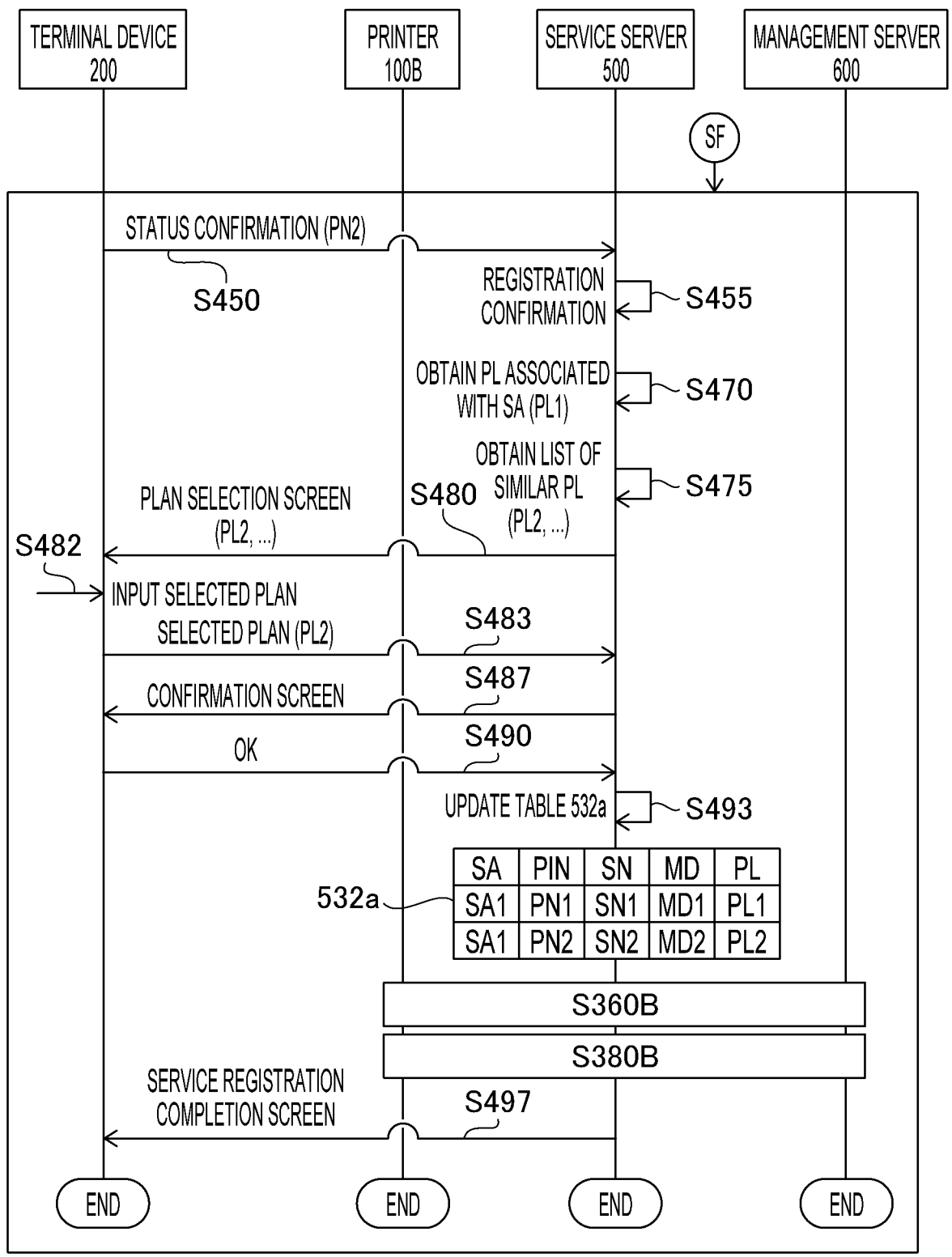

FIG. 10-FIG. 12 are sequence charts showing an example of the registration process for the second printer 100B. In this modified embodiment, whether the first plan identifier PL1 associated with the first printer 100A is applicable to the second printer 100B is determined using the model name MD. In this modified embodiment, the model name of the second printer 100B is different from the model name of the first printer 100A.

As shown in FIG. 10, the user installs the second printer 100B, turns on the power and connects the second printer 100B to the network. The following processes of S410, S415, S420, S215B, S220B, S225B, and S230B are the same as the processes of S410, S415, S420, S215B, S220B, S225B, and S230B in FIG. 7, respectively.

S235C is the same as S235B in FIG. 7, except that the registered device table 532*a* in FIG. 9A is updated. In FIG. 10, the updated registered device table 532*a* is shown. The registered device table 532*a* stores the correspondence relationship among the information SA1, PN1, SN1, MD1, PL1, and the correspondence relationship between the information SA1 and PN2. The other information SN, MD, and PL associated with SA1 and PN2 are not set. The following processes of S240B and S245B are the same as those of S240B and S245B in FIG. 7, respectively.

The process of S250C is the same as that of S250B in FIG. 7, except that the printer information includes the second model name MD2, in addition to the information PN2 and SN2. The subsequent process of S255B is the same as that of S255B in FIG. 7.

The process of S260C is the same as that of S260B in FIG. 7, except that information including the second model name MD2 is registered in the device information table 633*a* (FIG. 9B). The processor 610 of the management server 600 registers the correspondence relationship among the information SN2, MA1, MD2, and PN2 in the device information table 633*a*. The information SN2, PN2, and MD2 are obtained in S250C. In FIG. 10, the updated device information table 633*a* is shown. The device information table 633*a* contains the correspondence relationship between SN1, MA1, MD1, and PN1, and the correspondence relationship between SN2, MA1, MD2, and PN2. The following processes of S265B, S430, S435, and S285B are the same as that of S265B, S430, S435, and S285B in FIG. 7 and FIG. 8, respectively.

The process of S290C is the same as that of S290B in FIG. 8, except that MD2 is further added to the correspondence relationship between SN2 and PN2 as indicated by the printer information.

In S300C, the processor 510 updates the registered device table 532*a* to show the correspondence relationship among the information SN2, PN2, and MD2, which are obtained in S290C. FIG. 10 shows the updated registered device table 532*a*, in which the correspondence relationship of SN2 and MD2 is incorporated into the correspondence relationship between SA1 and PN2.

The process of S440 (FIG. 11) is the same as the process of S440 in FIG. 8. In S443, the processor 510 of the service server 500 determines whether the first plan identifier PL1 obtained in S440 is registrable. Hereafter, a condition for determining that the plan identifier PL is registrable is also referred to as an allowance condition. In this modified embodiment, the correspondence relationship between the model name MD and the list of plan identifiers PL that can be registered has been determined in advance. For example, a model name MD of an inkjet printer is associated with a plan identifier PL for a printing service that includes ink shipment. A model name MD of a laser printer is associated with a plan identifier PL for printing services including toner delivery. When the list of registrable plan identifiers PL associated with the second model name MD2 includes the first plan identifier PL1, the processor 510 determines that the first plan identifier PL1 is registrable. The model name MD referred to in this determination (in this case, the second model name MD2) is the model name MD associated by registered device table 532*a* (FIG. 10) to the second code PN2 obtained in S430 (FIG. 10, FIG. 8). As such, in this modified embodiment, the allowance condition is that the first plan identifier PL1 is included in the list of registrable plan identifiers PL that is associated with the second model name MD2 of the second printer 100B. In other words, the allowance condition includes that the first plan identifier PL1 is applicable to the second printer 100B.

When it is determined that the first plan identifier PL1 is registrable (S443: YES), in S445C, the processor 510 registers the first plan identifier PL1 obtained in S440 in association with the second code PN2 obtained in S430 (FIG. 10, FIG. 8) in the registered device table 532*a*. In FIG. 11, the updated registered device table 532*a* is shown. The registered device table 532*a* stores the correspondence relationship among SA1, PN1, SN1, MD1, PL1, and the correspondence relationship among SA1, PN2, SN2, MD2, and PL1.

The subsequent process of S360B is the same as that of S360B in FIG. 8. After S360B, the processor 110 of the second printer 100B periodically notifies the management server 600 of the remaining amount of consumables. This causes the order control process S380B for the consumables of the second printer 100B to be executed repeatedly.

The following processes of S450, S455, and S460 are the same as those of S450, S455, and S460 in FIG. 8, respectively. Then, the registration process is terminated.

Although not shown in the drawings, when the update (S445C) of the registered device table 532*a* has not been completed at the time of receipt of the status confirmation request (FIG. 11: S450), the registered device table 532*a* does not store the one or both of the serial number SN and the plan identifier PL associated with the second code PN2. In such a case, the processor 510 transmits data indicating that the printer is unregistered to the terminal device 200 instead of transmitting the registration completion screen data (S460). The processor 210 of the terminal device 200 repeats transmitting the status confirmation request (S450) until the registration completion screen data is received.

As such, when the first plan identifier PL1 selected in the preceding registration process for the first printer 100A is applicable to the second printer 100B, the first plan identifier PL1 will be associated with the second printer 100B. The user's burden is greatly reduced because the user does not have to select the plan again.

When it is determined that the first plan identifier PL1 is not registrable (S443: NO), the processor 510 does not update the registered device table 532*a* (S445C) or transmit a periodic remaining amount transmission request (S360B), and waits for a status confirmation request from the terminal device 200.

In S450 (FIG. 12), the processor 210 of the terminal device 200 transmits the status confirmation request to the service server 500. This request contains data representing the second code PN2, which is obtained in S240B (FIG. 10, FIG. 7).

In S455, the processor 510 of the service server 500 refers to the registered device table 532a to determine whether the serial number SN and the plan identifier PL of the printer associated with the second code PN2 have already been registered. At the stage of executing S455 in FIG. 12, the plan identifier PL is unregistered because the update of S300C in FIG. 10 has been performed and the update of S445C in FIG. 11 has not been performed. In such a case, in S470, the processor 510 refers to the registered device table 532a (FIG. 10) to obtain the first service account identifier SA1 associated with the second code PN2 obtained in S450. The processor 510 refers to the registered device table 532a (FIG. 10) to obtain the first plan identifier PL1 associated with the retrieved first service account identifier SA1.

In S475, the processor 510 obtains a list of plan identifiers PL that is similar to the first plan identifier PL1 obtained in S470 (hereinafter, referred to as a similar plan list). In this modified embodiment, each of the printing services has a list of similar printing services associated with it in advance. Although not shown in the drawings, data indicating the correspondence relationship between the plan identifier PL and the list of candidate similar plans is stored in advance in the non-volatile storage 530. The candidate similar plan list shows a list of similar services independent of the model name MD. The processor 510 refers to this data to obtain the candidate similar plan list associated with the first plan identifier PL1. The processor 510 obtains, from the candidate similar plan list, a list of plan identifiers PL that satisfy the allowance condition (S443 (FIG. 11)) as the similar plan list. In this example, a list of registrable plan identifiers PL associated with the second model name MD2 of the second printer 100B is retrieved.

The correspondence relationship between the printing services and similar printing services may be a variety of correspondence relationships. For example, a usage-based printing service that includes the shipping of ink is associated with a usage-based printing service that includes the shipping of toner as a similar service. Further, a fixed-fee printing service that includes shipping of ink is associated with a fixed-fee printing service that includes shipping of toner as a similar service. The similar plan list contains one or more plan identifiers PL. In the following description, it is assumed that the similar plan list obtained in S475 contains the second plan identifier PL2.

In S480, the processor 510 transmits the data of the plan selection screen to the terminal device 200. The plan selection screen shows a list of one or more similar services indicated by the similar plan list obtained in S475. The processor 210 of the terminal device 200 displays the plan selection screen on the display 240 according to the received data.

In S482, by referring to the plan selection screen, the user selects a printing service. The user inputs information indicating the selected plan by operating the operation panel 250 of the terminal device 200. Hereinafter, it is assumed that the selected plan is the service with the second plan identifier PL2. In S483, the processor 210 of the terminal device 200 transmits the data indicating the selected plan to the service server 500.

In S487, the processor 510 of the service server 500 transmits the data of the confirmation screen to the terminal device 200. In this modified embodiment, the confirmation screen includes a user interface (e.g., buttons, hyperlinks, etc.) for selecting whether or not to accept the entered information (including plans).

It is assumed here that the user selects to accept the information. In such a case, in S490, the processor 210 of the terminal device 200 transmits data indicating the acceptance to the service server 500. In S493, the processor 510 of the service server 500 registers the input information. In this modified embodiment, the processor 510 registers the second plan identifier PL2 indicating the selected plan obtained in S483 in the registered device table 532a in association with the second code PN2 obtained in S450. In FIG. 12, the updated registered device table 532a is shown. The registered device table 532a contains the correspondence relationship among SA1, PN1, SN1, MD1, and PL1, and the correspondence relationship among SA1, PN2, SN2, MD2, and PL2. The processor 510 stores data indicating the updated registered device table 532a in the non-volatile storage 530.

The subsequent process of S360B is the same as that of FIG. 8. After S360B, the processor 110 of the second printer 100B periodically notifies the management server 600 of the remaining amount of consumables. This causes the order control process in S380B for the consumables of the second printer 100B to be executed repeatedly.

In S497, the processor 510 transmits a service registration completion notification to the terminal device 200. The registration is then terminated.

Although not shown in the drawings, if the user selects rejection on the confirmation screen in S487, the processor 510 of the service server 500 causes the terminal device 200 to display the screen for modifying information. The user modifies the information by operating the operation panel 250. The user then selects to accept the information, and processor 210 of the terminal device 200 executes S490.

As described above, in this modified embodiment, the processing server 700 performs the following processes. Through the process including S235 in FIGS. 4, S300 and S350 in FIG. 5, and S235C in FIG. 10, the service server 500 associates the first service account identifier SA1, the first plan identifier PL1, and the second code PN2 with each other and registers the same in the non-volatile storage 530 (concretely, the registered device table 532a shown in FIG. 10). As mentioned above, when the plan identifier PL directly associated with the second code PN2 is not yet set, the first plan identifier PL1 can be used as the plan identifier PL associated with the second code PN2 via the first service account identifier SA1.

In S410 (FIG. 10), as in S410 of FIG. 7, the service server 500 obtains a registration request including the first service account identifier SA1 from the terminal device 200. In S240B (FIG. 10), similar to S240B in FIG. 7, the service server 500 transmits the second code PN2 associated with the first service account identifier SA1 included in the registration request to the terminal device 200. In S250C (FIG. 10), the management server 600 obtains the second serial number SN2 and the second code PN2 from the second communication device 100B. The second code PN2 is an example of the authentication information received by the terminal device 200. As in the embodiment shown in FIG. 7, the second code PN2 obtained by the management server 600 is information transmitted by the second communication device 100B based on the second code PN2 received by the terminal device 200.

Through the process including S235C and S300C in FIGS. 10 and S445C in FIG. 11, the service server 500 associates the second serial number SN2 of the second communication device 100B with the first service account identifier SA1 and the first plan identifier PL1 and registers the same in the non-volatile storage 530 (concretely, the registered device table 532a). The first service account identifier SA1 is the service account identifier SA associated with the second code PN2 that is obtained from the second communication device 100B at S250C in FIG. 10 (S435 (FIG. 10, FIG. 8)). The first plan identifier PL1 is the plan identifier PL associated with the second code PN2 that is obtained from the second communication device 100B (FIG. 11: S440). As described above, when the plan identifier PL directly associated with the second code PN2 is not yet set, the first plan identifier PL1 can be used as the plan identifier PL associated with the second code PN2 via the first service account identifier SA1. The registration in S445C is performed when the result of the decision in S443 is YES, i.e., when the allowance condition is satisfied. The allowance condition is a condition for allowing the association of the first plan identifier PL1 associated with the second code PN2 obtained from the second communication device 100B and the second serial number SN2 of the second communication device 100B.

As such, the processing server 700 can appropriately associate the second serial number SN2 of the second communication device 100B with the first plan identifier PL1, when the allowance condition is satisfied (FIG. 11: S443: YES).

Through the process including S235 in FIGS. 4, S300 and S350 in FIG. 5, and S235C in FIG. 10, the service server 500 associates the first serial number SN1 indicating the first communication device 100A, the information SA1, PL1 and PN2 with each other, prior to registration of the second serial number SN2 of the second communication device 100B, and registers the same in the non-volatile storage 530 (concretely, the registered device table 532a). The allowance condition in S443 (FIG. 11) includes that the first plan identifier PL1 is applicable to the second communication device 100B. The first plan identifier PL1 referred to for the allowance condition is the plan identifier PL associated with the second code PN2 (FIG. 10: S250C) obtained from the second communication device 100B and associated with the first serial number SN1. Since the plan identifier PL directly associated with the second code PN2 has not been set at the time of the determination in S443 (the registered device table 532a shown in FIG. 10), the first plan identifier PL1 can be used as the plan identifier PL to be associated with the second code PN2 via the first service account identifier SA1. In this way, since the second serial number SN2 of the second communication device 100B is associated with the first plan identifier PL1 that is associated with the first serial number SN1 of the first communication device 100A, the processing server 700 can easily associate the second serial number SN2 with the first plan identifier PL1. Further, the burden on the user for registration of the second communication device 100B can be reduced. For example, in the registration process of the second communication device 100B, the input of a selected plan by the user can be omitted.

Further, when the allowance condition is not satisfied (S443 of FIG. 11: NO), the service server 500 associates the second serial number SN2 with the first service account identifier SA1 and the second plan identifier PL2, which indicates a service similar to that indicated by the first plan identifier PL1, and registers the second serial number SN2 in the non-volatile storage 530 (concretely, the registered device table 532a) in S493 of FIG. 12. In this way, the processing server 700 can associate the second serial number SN2 with a second plan identifier PL2, which indicates a service similar to the first plan identifier PL1, when the allowance condition is not satisfied.

Further, when the allowance condition is not satisfied (S443 of FIG. 11: NO), the service server 500 performs the following process. In S480 (FIG. 12), the service server 500 transmits data that causes the terminal device 200 to display a list of one or more similar services which are similar to the service indicated by the first plan identifier PL1 to the terminal device 200. In S483, the service server 500 obtains from the terminal device 200 information indicating similar services to be selected from the list of one or more similar services (in this case, the selected plan). Through the process including S235C and S300C in FIGS. 10 and S493 in FIG. 12, the service server 500 associates the second serial number SN2 of the second communication device 100B with the first service account identifier SA1 and the second plan identifier PL2 indicating a similar service to be selected, and registers the same in the non-volatile storage 530 (concretely, the registered device table 532a).

In this way, the processing server 700 can associate the second serial number SN2 with the second plan identifier PL2, which indicates a service similar to the first plan identifier PL1, when the allowance condition is not satisfied. Further, the burden on the user for registration of the second communication device 100B can be reduced. For example, when the plan selection screen displayed in S480 (FIG. 12) shows a list of many services, including services that are not similar to the registered first plan identifier PL1, the burden on the user to select a desired service (e.g., a service similar to the first plan identifier PL1) from among the many services is significant. In the present embodiment, the burden on the user to select a service is reduced.

Further, in the modified embodiment, as in the above-described embodiment, the service server 500 obtains the first plan identifier PL1 through the process including S320 and S325 in FIG. 5. The first plan identifier PL1 indicates a selected plan indicating a selection service, which is a service to be selected from a plurality of services in a list displayed on the terminal device 200. As described above, when the user selects a service, the first plan identifier PL1 can indicate the appropriate services (i.e., the services selected to be selected by the user).

In this modified embodiment, as communication device information indicating the communication device 100, a model name MD is used in addition to the serial number SN. Therefore, the processing server 700 can associate a plan identifier PL suitable for the model name MD with the communication device information.

When the first plan identifier PL1 is associated with the second communication device 100B (S443 of FIG. 11: YES), the printing service indicated by the first plan identifier PL1 is a service that includes shipping of consumables used by the second communication device 100B. The processing server 700 can appropriately associate the service (PL1) that includes shipping of consumables for the second communication device 100B with the second serial number SN2 of the second communication device 100B. Similarly, when the second plan identifier PL2 is associated with the second communication device 100B (S443 of FIG. 11: NO), the printing service indicated by the second plan identifier PL2 is a service that includes shipping of consumables used by the second communication device 100B. The processing server 700 can appropriately associate the service (PL2) that includes shipping of consumables for the second communication device 100B with the second serial number SN2 of the second communication device 100B.

C. ANOTHER MODIFIED EMBODIMENT

Figure 13:
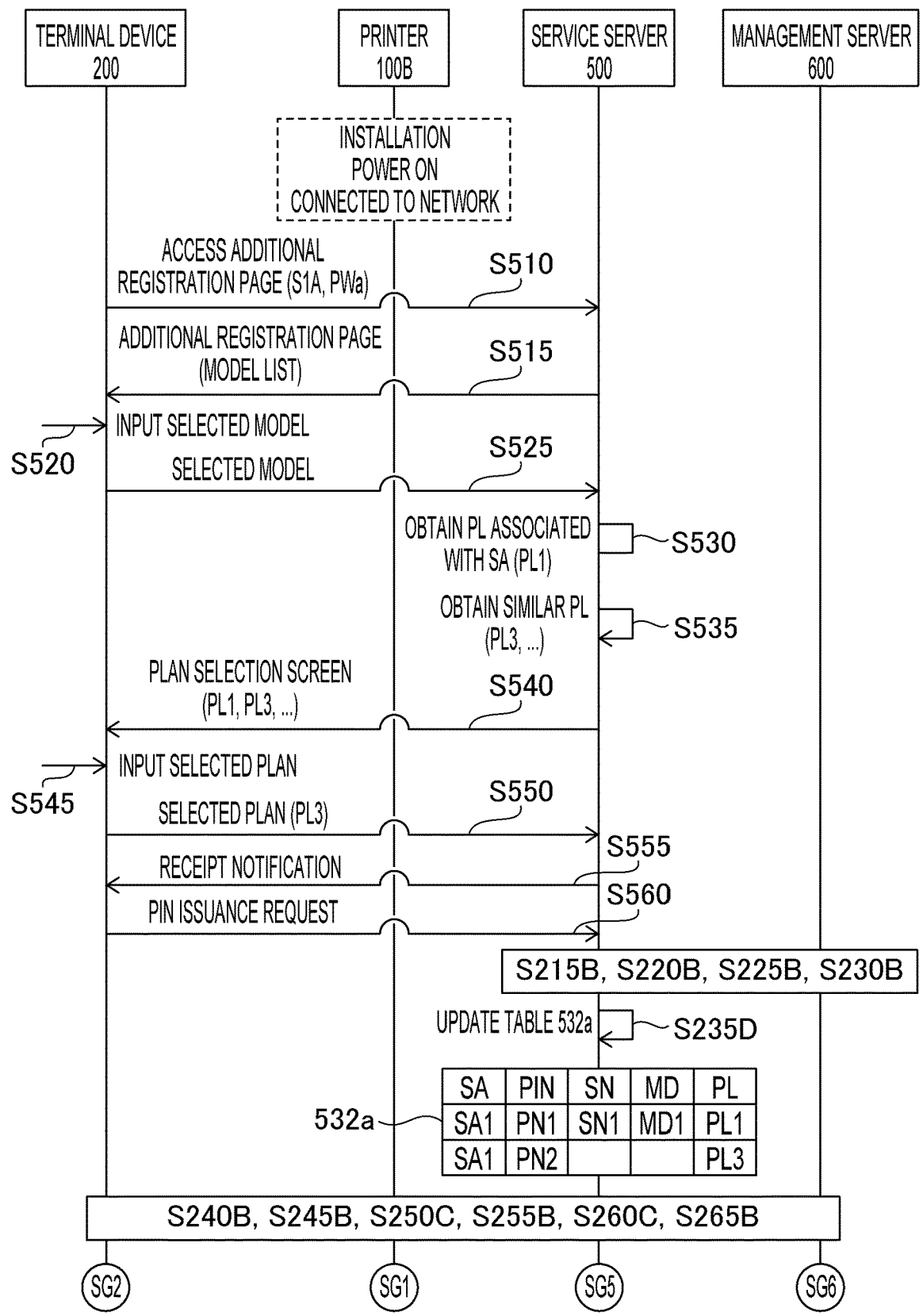
Figure 14:
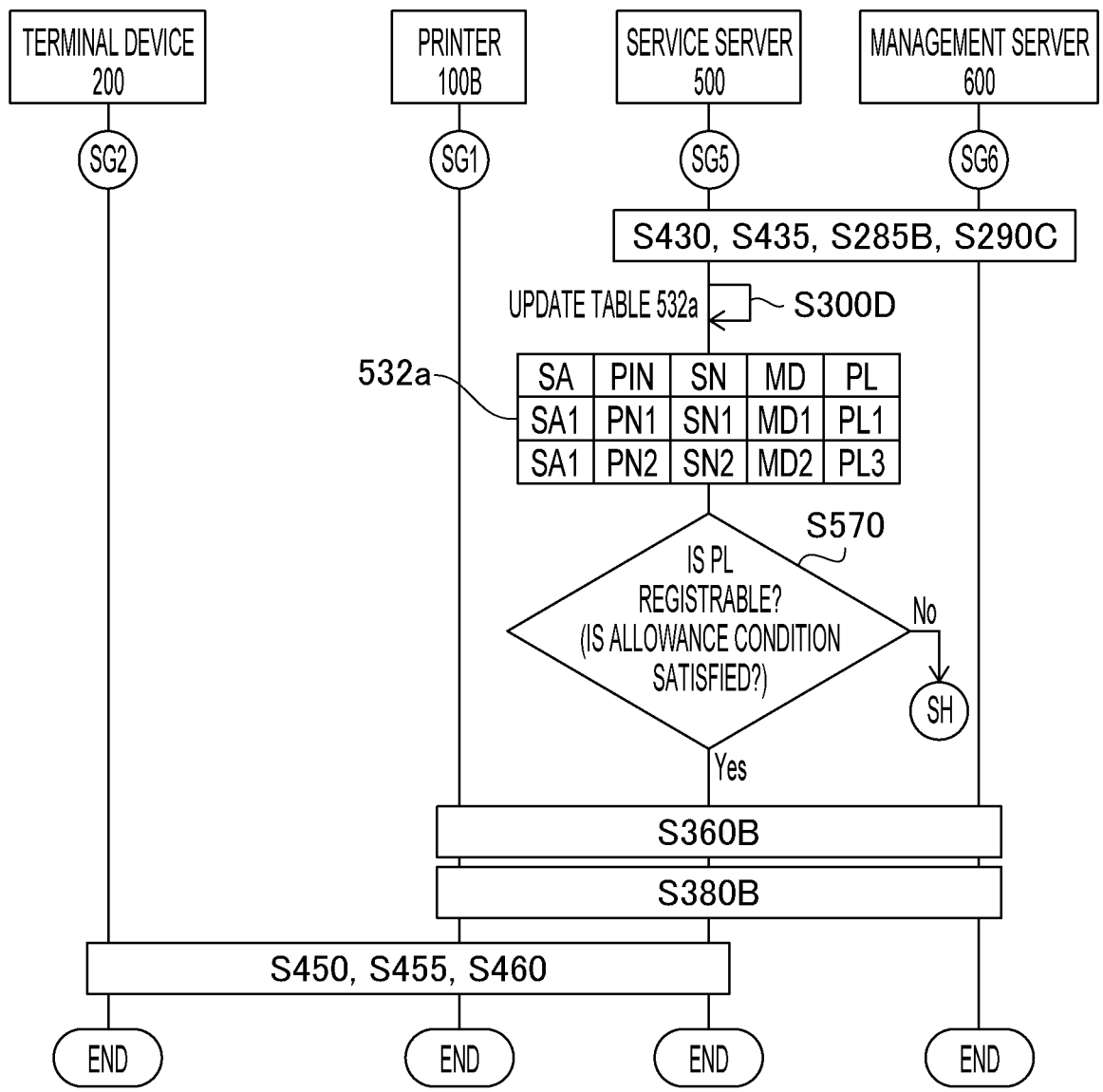
Figure 15:
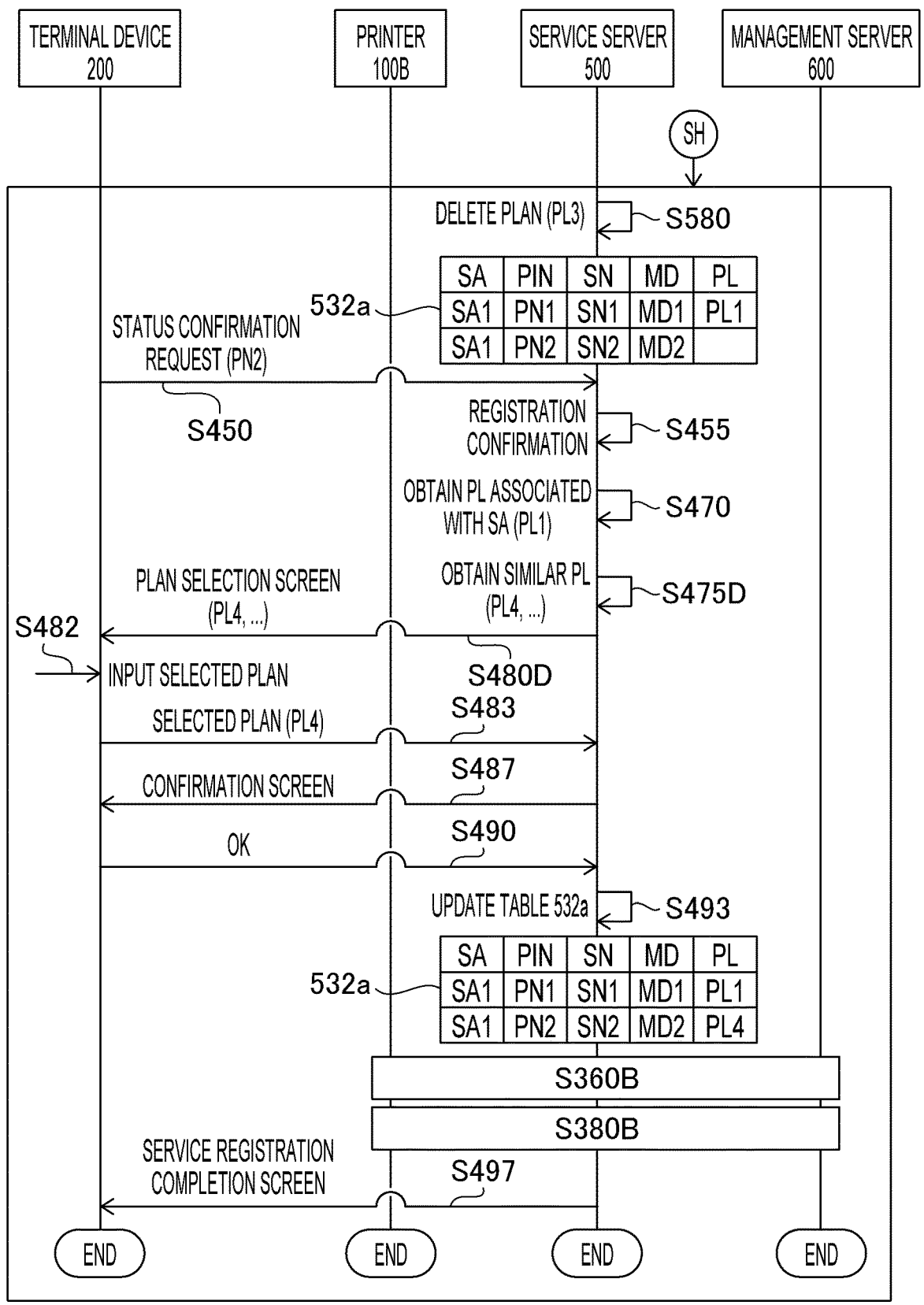

FIGS. 13-15 are sequence charts showing an example of the registration process for the second printer 100B. The difference from the registration process in the above-described modified embodiment (FIGS. 10-12) is that the registration process for the second printer 100B proceeds using the model name MD selected by the user. The tables 532a and 633a shown in FIG. 9A and FIG. 9B are also used in the present embodiment (i.e., the other modified embodiment).

As shown in FIG. 13, the user installs the second printer 100B, turns on the power, and connects the second printer 100B to the network. In S510, the user inputs an access instruction to access the additional registration page by operating the operation panel 250 of the terminal device 200 (FIG. 1). The processor 210 of the terminal device 200 transmits a request for access to the additional registration page to the service server 500. As in S410 of FIG. 7, this request contains data indicating the information SA1 and PWa input by the user.

In S515, the processor 510 of the service server 500 authenticates the information SA1 and PWa by referring to the service table 531 (FIG. 2(A)). Hereinafter, it is assumed that the authentication is successful. In S515, the processor 510 transmits the data of the additional registration page to the terminal device 200. In the other modified embodiment, the additional registration page shows a list of the printer 100 models. The processor 210 of the terminal device 200 displays the additional registration page on the display 240 according to the received data.

In S520, the user selects the model of the second printer 100B by referring to the displayed list of models (in the following description, the selected model will be referred to as a selected model). The user inputs information indicating the selected model by operating the operation panel 250 of the terminal device 200. In S525, the processor 210 of the terminal device 200 transmits the data indicating the selected model to the service server 500. It is noted that the user may mistakenly select a model different from the model of the second printer 100B.

In S530, the processor 510 of the service server 500 refers to the registered device table 532a (FIG. 9A) to obtain the plan identifier PL associated with the first service account identifier SA1 obtained in S510 (in this case, the first plan identifier PL1).

In S535, the processor 510 obtains a list of plan identifiers PL similar to the first plan identifier PL1 obtained in S530 (i.e., the similar plan list). Similar to S475 in FIG. 12, the processor 510 obtains a candidate similar plan list that is associated in advance with the first plan identifier PL1. The processor 510 obtains a list of registrable plan identifiers PL associated with the selected model (S525) from the candidate similar plans as the similar plan list. Hereinafter, it is assumed that the similar plan list as obtained includes the third plan identifier PL3. In S535, the processor 510 may adopt the candidate similar plan list as the similar plan list.

In S540, the processor 510 transmits the data of the plan selection screen to the terminal device 200. The plan selection screen shows a list of multiple printing services including the printing service indicated by the first plan identifier PL1 obtained in S530 and similar services indicated by the similar plan list obtained in S535. The processor 210 of the terminal device 200 displays the plan selection screen on the display 240 according to the received data.

In S545, the user selects a printing service by referring to the plan selection screen. The user inputs information indicating the selected plan by operating the operation panel 250 of the terminal device 200. Hereinafter, it is assumed that the selected plan is the service indicated by the third plan identifier PL3. In S550, the processor 210 of the terminal device 200 transmits the data indicating the selected plan to the service server 500. In S555, the processor 510 of the service server 500 transmits a receipt notification to the terminal device 200.

In S560, the user inputs a proceeding instruction to proceed with the rest of the process by operating the operation panel 250 of the terminal device 200. The processor 210 of the terminal device 200 transmits a PIN issuance request to the service server 500. The following processes of S215B, S220B, S225B, and S230B are the same as that of S215B, S220B, S225B in FIG. 7, respectively. The PIN issuance request in S215B contains data indicating the first management account identifier MA1, which is associated with the first service account identifier SA1 that has already been authenticated in S510 and S515 by the service table 531 (FIG. 2A).

In S235D, the processor 510 of the service server 500 registers the correspondence relationship among the first service account identifier SA1 authenticated in S510 and S515, the second code PN2 obtained in S230B, and the third plan identifier PL3 obtained in S550, in the registered device table 532a. In FIG. 13, the updated registered device table 532a is shown. The registered device table 532a contains the correspondence relationship among the information SA1, PN1, SN1, MD1, and PL1, and the correspondence relationship among the information SA1, PN2, and PL3.

The following processes of S240B, S245B, S250C, S255B, S260C, and S265B are the same as those of S240B, S245B, S250C, S255B, S260C and S265B in FIG. 10, respectively.

The following processes of S430, S435, S285B, and S290C (FIG. 14) are the same as those of S430, S435, S285B, and S290C in FIG. 10, respectively.

In the subsequent process of S300D, the processor 510 of the service server 500 updates the registered device table 532a to show the correspondence relationship among the information SN2, PN2, and MD2, which is obtained in S290C (same as S290C in FIG. 10). In FIG. 13, the updated registered device table 532a is shown. To the correspondence of SA1, PN2 and PL3, information SN2 and MD2 are associated. The second model name MD2 can be different from the selected model obtained in S525 (FIG. 13) since the user could mistakenly select an inappropriate model in S520.

It should be noted that the registration of information in S300D (in particular, the registration of the correspondence relationship between SN2 and PL3) is a provisional registration. If the allowance condition (S570) described below is not satisfied, the association between SN2 and PL3 is canceled.

In S570, the processor 510 of the service server 500 determines whether the third plan identifier PL3 associated with the second model name MD2 registered in S300D can be registered. The method of this determination is the same as that of S443 in FIG. 11. In the other modified embodiment, the processor 510 determines that the third plan identifier PL3 is registrable when the list of registrable plan identifiers PL3 associated with the second model name MD2 registered in S300D includes the third plan identifier PL3.

When the third plan identifier PL3 is determined to be registrable (S570: YES), S360B is executed. The process of S360B is the same as the process of S360B in FIG. 8. After S360B, the processor 110 of the second printer 100B periodically notifies the management server 600 of the remaining amount of consumables. This causes the order control process S380B for the consumables of the second printer 100B to be executed repeatedly.

The following processes of S450, S455, and S460 are the same as those of S450, S455, and S460 in FIG. 8, respectively. The registration process is then terminated.

Although not shown in the drawings, if the determination of S570 has not been made at the time of receipt of the status confirmation request (FIG. 14: S450), the processor 510 transmits data indicating that the printer is not registered to the terminal device 200, instead of transmitting the data of the registration completion screen (S460). The processor 210 of the terminal device 200 repeats the transmission of the status confirmation request (S450) until the registration completion screen data is received.

In this way, when the third plan identifier PL3 selected by the user is applicable to the second printer 100B, the third plan identifier PL3 is associated with the second printer 100B.

When it is determined that the third plan identifier PL3 is not registrable (S570: NO), the processor 510 deletes the third plan identifier PL3 from the registered device table 532a in S580 (FIG. 15). Then, the processor 510 waits for the status confirmation request from the terminal device 200.

The following processes of S450, S455, and S470 are the same as those of S450, S455, and S470 in FIG. 12, respectively.

In S475D, the processor 510 of the service server 500 obtains the similar plan list for the first plan identifier PL1 obtained in S470. The method of obtaining the similar plans is the same as that of S475 in FIG. 12. The processor 510 obtains, from the candidate similar plan lists associated with the first plan identifier PL1, a list of plan identifiers PL that satisfy the allowance condition in S570 (FIG. 14) as the similar plan list. In this case, a list of registrable plan identifiers PL associated with the second model name MD2 of the second printer 100B is retrieved. Hereinafter, it is assumed that the similar plans that are obtained include the fourth plan identifier PL4.

In S480D, the processor 510 transmits the plan selection screen data to the terminal device 200. The plan selection screen shows a list of print services applicable to the second model name MD2 among the print services including the print services indicated by the first plan identifier PL1 obtained in S470 and similar services indicated by the similar plan list obtained in S475D. The second model name MD2 is the model name MD that is associated with the second code PN2 obtained in S450 by the registered device table 532a (FIG. 15). The processor 210 of the terminal device 200 displays the plan selection screen on the display 240 according to the received data. It is assumed here that the list shown by the plan selection screen includes the services corresponding to the fourth plan identifier PL4. This list may include the services corresponding to the first plan identifier PL1.

The following processes of S482, S483, S487, S490, S493, S360B, S380B, and S497 are the same as those of S482, S483, S487, S490, S493, S360B, S380B, and S497 in FIG. 12, respectively. The registration process is then terminated. In S482, a service corresponding to the fourth plan identifier PL4 is assumed to be selected.

As described above, the processing server 700 performs the following processes. Through the process including S235 in FIGS. 4, S300 and S350 in FIG. 5, and S235D in FIG. 13, the service server 500 associates the first service account identifier SA1, the third plan identifier PL3, and the second code PN2 with each other and registers the same in the non-volatile storage 530 (concretely, the registered device table 532a (FIG. 13)). In S510 (FIG. 13), similar to S410 in FIG. 7, the service server 500 obtains a registration request including the first service account identifier SA1 from the terminal device 200. In S240B (FIG. 13), similar to S240B in FIG. 7, the service server 500 transmits the second code PN2 associated with the first service account identifier SA1 included in the registration request to the terminal device 200. In S250C (FIG. 13) the management server 600 obtains the second serial number SN2 and the second code PN2 from the second communication device 100B.

Through the process including S235D in FIG. 13, and S300D and S570 (YES) in FIG. 14, the service server 500 registers the second serial number SN2 of the second communication device 100B in association with the first service account identifier SA1 and the third plan identifier PL3 in the non-volatile storage 530 (concretely, the registered device table 532a). The first service account identifier SA1 is the service account identifier SA associated with the second code PN2 that is obtained from the second communication device 100B in S250C of FIG. 13 (same as S250C in FIG. 10) (see S435 of FIG. 14 and FIG. 8). The third plan identifier PL3 is the plan identifier PL associated with the second code PN2 that is obtained from the second communication device 100B (FIG. 13: S235D). The registration in S300D (FIG. 14) is valid when the result of the determination in S570 is YES, i.e., when the allowance condition is satisfied. The allowance condition is a condition in which the association of the third plan identifier PL3 associated with the second code PN2 obtained from the second communication device 100B and the second serial number SN2 of the second communication device 100B is acceptable.

Thus, when the allowance condition is satisfied (S570 of FIG. 14: YES), the processing server 700 can appropriately associate the second serial number SN2 of the second communication device 100B with the third plan identifier PL3.

Further, the processing server 700 performs the following processes. Through the process including S235 in FIGS. 4, S300 and S350 in FIG. 5, and S235D in FIG. 13, the service server 500 associates the information SA1, PL1, PN2, and SN1 with each other and stores the same in the non-volatile storage 530 (concretely, the registered device table 532a) prior to registration of the second serial number SN2 of the second communication device 100B. In S 540 of FIG. 13, the service server 500 transmits data to the terminal device 200 that causes the terminal device 200 to display a list of multiple services, including the service with the first plan identifier PL1. In S550, the service server 500 obtains information indicating the selected service (in this case, the service with the third plan identifier PL3), which is the service to be selected from among the displayed multiple services, from the terminal device 200. The third plan identifier PL3, which is associated with the second serial number SN2 through S300D, S570 (YES) in FIG. 14, indicates the selected service. In this way, the processing server 700 can associate an appropriate service, selected by the user from among a plurality of services, with the second communication device 100B.

The process of S510 (FIG. 13)-S300D (FIG. 14) described above may be performed instead of S410 (FIG.

7)-S445 (FIG. 8) in the above-described embodiment. In such a case, the printing service provider may provide printing services applicable to all models.

D. MODIFICATIONS

While the present disclosures have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosures, and not limiting the same. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations according to aspects of the present disclosures are provided below.

(1) The registration process for communication devices may be various other processes instead of the processes in each of the above embodiments. For example, the plan selection screen shown in S540 of FIG. 13 may show a list of printing services applicable to the selected model out of the printing services obtained in S530 and S535. When the total number of service choices is 1 in S320 (FIG. 5), S480 (FIG. 12), S540 (FIG. 13), and S480D (FIG. 15), the service server 500 may be configured to automatically adopt that choice without displaying a selection screen on the terminal device 200. When the allowance condition of S443 (FIG. 11) or S570 (FIG. 14) is not satisfied, the processing server 700 may abort the registration process. Alternatively, when the allowance condition is not satisfied, the processing server 700 may associate the communication device with a default service that has been determined in advance and register the same.

(2) The registration process for the first communication device may be the same as the registration process for the second communication device. For example, when contracting for a service, the processing server 700 may associate the management account identifier MA, the service account identifier SA, the password PW, and the default plan identifier, and store the same in a storage (e.g., non-volatile storage 530). Then, in S440 (FIG. 8 and FIG. 11) and S470 (FIG. 12), the processor 510 may adopt a default plan identifier as the plan identifier PL to be associated with the service account identifier SA.

(3) The authentication information may be any other information instead of the PIN. For example, the authentication information may be an image, such as a geometric pattern or a photograph. In any case, instead of generating new authentication information (S220 of FIG. 4, S220B of FIG. 7, FIG. 10, FIG. 13), the processing server 700 may select authentication information to use from a plurality of pieces of authentication information determined in advance. As such, the processing server 700 may determine the authentication information to be used according to various processes, such as generation, selection, and so on. Alternatively, the authentication information may be determined in advance. In such a case, the processing server 700 may prohibit the registration process of other communication devices while the registration process of one communication device is in progress.

(4) The method of communicating the authentication information (e.g., PIN) from the terminal device 200 to the communication device 100 may be any method. For example, the terminal device 200 may display an image indicating authentication information (e.g., bar code or QR code (registered trademark)), and the communication device 100 may acquire authentication information by reading the displayed image with a digital camera. Alternatively, the terminal device 200 may transmit data indicating the authentication information to the communication device 100 via a network. In any case, the communication device 100 may be configured to obtain authentication information in response to an operation by the user.

(5) The consumables shipped in response to low residual quantities are not limited to printing materials such as ink or toner, but may be other consumables for printing, such as photoreceptor drums, printing sheets, and the like. Further, the communication device may be various devices configured to perform particular functions in place of the printer 100. For example, the communication device may be a sewing machine, an air cleaner, or an industrial robot. The consumables that are shipped in response to low remaining amounts may be any consumable consumed by the communications device, such as thread consumed by the sewing machine, filters for the air purifier, machine oil consumed by the industrial robot, etc.

(6) The service subject to the registration process by the processing server 700 may be any other service instead of a service that includes shipping supplies. For example, the service may be a storage service that provides cloud storage. In that case, the service provider may provide multiple storage services with storage capacities that differ from each other.

When the communication device is the printer 100, the print data for cloud printing may be stored in the cloud storage. The processing server 700 may associate and register the printer 100 with the storage service through a registration process for the printer 100. The communication device may be a scanner that optically reads an object. The scanner may store image data of the object in the cloud storage. The processing server 700 may associate and register the scanner with the storage service through a scanner registration process.

Alternatively, the service provider may provide multiple storage services, including a storage service for the printer 100 (e.g., for cloud printing) and a storage service for the scanner. The processing server 700 may then associate the communication device with a suitable storage service for the communication device among these multiple storage services through a registration process.

(7) In S475 (FIG. 12), S535 (FIG. 13), and S475D (FIG. 15), the similarity among multiple services is defined as follows. As an example, multiple usage-based services are similar to each other, while multiple subscription (fixed-fee) services are similar to each other. The usage-based services and the fixed-fee services are not similar to each other. The similarity correspondence relationship may be defined from various other perspectives instead of such a correspondence relationship. For example, the service provider may provide multiple storage services. In such a case, the multiple storage services may be similar to each other when the capacity is the same among the multiple storage services, while the multiple storage services may be dissimilar to each other when the capacity differs among the multiple storage services. In the registration process for the second communication device, the processing server 700 may associate a storage service with the same capacity as the storage service associated with the first communication device.

In any case, the correspondence between a service and a list of one or more similar services that are similar to that service may have been determined in advance.

(8) The process of registering information related to the communication device to the processing server 700 may be various other processes instead of the processes in each of the above embodiments and each of the modifications.

(9) One server device may provide all the functions of the processing server 700. In such a case, one server device may perform both the functions of the service server 500 and the management server 600 (the communication process between the service server 500 and the management server 600 is omitted). Multiple tables (e.g., tables 531, 532, 631, 632, 633 in FIGS. 2A-2E) may be aggregated into a single table. Alternatively, multiple devices (e.g., computers) that can communicate with each other via a network may share some of the functions of the registration process by the processing server and, as a whole, provide the functions of the registration process (a system with these devices corresponds to a server). Various correspondences (e.g., correspondence between serial number SN and plan identifier PL) may be indicated by multiple pieces of data. For example, the correspondence may be indicated by multiple pieces of data distributed across multiple devices.

In each of the above examples, part of the configuration realized by hardware may be replaced with software, or conversely, part or all of the configuration realized by software may be replaced with hardware. For example, the function of generating the PIN shown in FIG. 4 (S220) may be realized by a dedicated hardware circuit.

When some or all of the functions according to the present disclosures are realized by a computer program, the program can be provided in a form stored in a computer-readable recording medium (e.g., a non-transitory computer-readable recording medium). The program can be used as stored on the same recording medium when provided or a recording medium (e.g., a computer-readable recording medium) different from one when the program was provided. It is noted that the computer-readable recording media is not limited to portable recording media such as memory cards or CD-ROMs, but can also include internal storages in the computer such as various ROMs, and external storages connected to the computer such as hard disk drives.

The embodiment, the modified embodiment and the modifications thereof described above are intended to facilitate understanding aspects of the present disclosures and are not intended to limit the aspects of the present disclosures. The configurations described above may be modified and/or improved without departing from the aspects of the present disclosures, and the aspects of the present disclosures include equivalents of the disclosed configurations.

What is claimed is:

1. A server for a device information management system that includes a terminal device, and a communication device, the server comprising a storage and a controller including hardware, the controller being configured to perform:

first registering user information indicating a user, first service information indicating a first service to be provided to the user, and authentication information in an associated manner;

first obtaining a request containing the user information from the terminal device;

in response to the request, first transmitting the authentication information associated with the request to the terminal device;

second obtaining target communication device information, indicating a target device and the authentication information received by the terminal device, from the target communication device;

second registering the target communication device information in the storage in association with the user information associated with the authentication information obtained from the target communication device and the first service information associated with the authentication information obtained from the target communication device; and when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device, wherein, in the second registering, the controller associates the target communication information with the user information and similar service information indicating similar services similar to the first service indicated by the first service information and registers the target communication device information in the storage when the allowance conditions is not satisfied.

2. The server according to claim 1, wherein, in the first registering, the controller further performs, prior to registering the target communication device information, registering former communication device information indicating a former communication device in addition to the user information, the first service information and the authentication information, in the storage in an associated manner, and wherein, in the second registering, the controller further performs registering the target communication device information in association with the first service information associated with the authentication information obtained from the target communication device and also associated with the former communication device.

3. The server according to claim 1, wherein the controller is further configured to perform:

second transmitting data causing the terminal device to display a list of multiple service to the terminal device; and third obtaining information indicating a selected service which is a service selected from the multiple service from the terminal device, wherein the first service information indicates the selected service.

4. The server according to claim 1, wherein the controller is further configured to perform:

prior to registration of the target device information, registering the user information, prior service information indicating a second service to be provided to the user, the authentication information, and prior communication information indicating a prior communication device in the storage in an associated manner;

second transmitting data causing the terminal device to display a list of multiple services including the second service to the terminal device; and third obtaining information indicating a selected service which is a service selected from the multiple services from the terminal device,
wherein the first service information is the selected service.

5. The server according to claim 1, wherein the target communication device information contains a model name of the target communication device.

6. The server according to claim 1, wherein the first service is a service including shipping of consumables used by the target communication device.

7. A server for a device information management system that includes a terminal device, and a communication device, the server comprising a storage and a controller including hardware, the controller being configured to perform:
first registering user information indicating a user, first service information indicating a first service to be provided to the user, and authentication information in an associated manner;
first obtaining a request containing the user information from the terminal device;
in response to the request, first transmitting the authentication information associated with the request to the terminal device;
second obtaining target communication device information, indicating a target device and the authentication information received by the terminal device, from the target communication device; and
when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device,
wherein, in a second registering, the controller associates the target communication information with the user information and similar service information indicating similar services similar to the first service indicated by the first service information and registers the target communication device information in the storage when the allowance condition is not satisfied.

8. The server according to claim 7, wherein, in the first registering, the controller further performs, prior to registering the target communication device information, registering former communication device information indicating a former communication device in addition to the user information, the first service information and the authentication information, in the storage in an associated manner, and
wherein the allowance condition includes a state where the first service information and which is associated with the authentication information obtained from the target communication device and is associated with the former communication device information is applicable to the target communication device.

9. The server according to claim 7, wherein, when the allowance condition is not satisfied, in the second registering, the controller performs:
transmitting data causing the terminal device to display a list of one or more similar services that are similar to the first service indicated by the first service information to the terminal device;
obtaining information indicating a selected similar service that is selected from among the one or more similar services in the list; and
registering the target communication device information in the storage in association with the user information, the similar service information indicating the selected similar service.

10. A non-transitory computer-readable recording medium for a server of a device information management system that includes a terminal device, and a communication device, the server having a storage and a controller including hardware, the recording medium containing computer-executable instructions which cause, when executed by the controller, the server to perform:
first registering user information indicating a user, first service information indicating a first service to be provided to the user, and authentication information in an associated manner;
first obtaining a request containing the user information from the terminal device;
in response to the request, first transmitting the authentication information associated with the request to the terminal device;
second obtaining target communication device information, indicating a target device and the authentication information received by the terminal device, from the target communication device;
second registering the target communication device information in the storage in association with the user information associated with the authentication information obtained from the target communication device and the first service information associated with the authentication information obtained from the target communication device; and
when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device,
wherein, in the second registering, the controller associates the target communication information with the user information and similar service information indicating similar services similar to the first service indicated by the first service information and registers the target communication device information in the storage when the allowance condition is not satisfied.

11. A non-transitory computer-readable recording medium for a server of a device information management system that includes a terminal device, and a communication device, the server having a storage and a controller including hardware, the recording medium containing computer-executable instructions which cause, when executed by the controller, the server to perform:
first registering user information indicating a user, first service information indicating a first service to be provided to the user, and authentication information in an associated manner;
first obtaining a request containing the user information from the terminal device;

in response to the request, first transmitting the authentication information associated with the request to the terminal device;

second obtaining target communication device information indicating a target device and the authentication information received by the terminal device, from the target communication device; and when an allowance condition defining an association between the first service information associated with the authentication information obtained from the target communication device and the target communication device information is satisfied, registering the target communication device information in the storage with associating the target communication device information with the user information and the first service information both associated with the authentication information obtained from the target communication device, wherein, in a second registering, the controller associates the target communication information with the user information and similar service information indicating similar services similar to the first service indicated by the first service information and registers the target communication device information in the storage when the allowance condition is not satisfied.

* * * * *